United States Patent
Yang et al.

(10) Patent No.: US 11,891,458 B2
(45) Date of Patent: Feb. 6, 2024

(54) STARCH-CONTAINING MICROSPHERE AND PREPARATION METHOD AND USE THEREOF

(71) Applicants: CHINA PETROLEUM & CHEMICAL CORPORATION, Beijing (CN); DALIAN RESEARCH INSTITUTE OF PETROLEUM AND PETROCHEMICALS, SINOPEC CORP., Liaoning (CN)

(72) Inventors: Chao Yang, Liaoning (CN); Chen Wang, Liaoning (CN); Zequn Yin, Liaoning (CN); Quanjie Liu, Liaoning (CN)

(73) Assignees: CHINA PETROLEUM & CHEMICAL CORPORATION, Beijing (CN); DALIAN RESEARCH INSTITUTE OF PETROLEUM AND PETROCHEMICALS, SINOPEC CORP., Liaoning (CN)

( * ) Notice: Subject to any disclaimer, the term of this patent is extended or adjusted under 35 U.S.C. 154(b) by 0 days.

(21) Appl. No.: 17/658,173

(22) Filed: Apr. 6, 2022

(65) Prior Publication Data
US 2022/0227893 A1 Jul. 21, 2022

Related U.S. Application Data

(62) Division of application No. 16/641,504, filed as application No. PCT/CN2018/101771 on Aug. 22, 2018, now abandoned.

(30) Foreign Application Priority Data

Aug. 22, 2017 (CN) .......................... 201710720844.7
Aug. 22, 2017 (CN) .......................... 201710720850.2
(Continued)

(51) Int. Cl.
C08B 31/00 (2006.01)
C08B 31/12 (2006.01)
(Continued)

(52) U.S. Cl.
CPC ............ C08B 31/003 (2013.01); C08B 31/12 (2013.01); C09K 8/426 (2013.01); E21B 21/003 (2013.01); E21B 33/138 (2013.01)

(58) Field of Classification Search
None
See application file for complete search history.

(56) References Cited

U.S. PATENT DOCUMENTS 6,380,138 B1 4/2002 Ischy et al.
6,391,290 B1 5/2002 Fowler
(Continued)

FOREIGN PATENT DOCUMENTS

CN 1756780 A 4/2006
CN 102008926 A 4/2011
(Continued)

OTHER PUBLICATIONS

CN 107459664 Aug. 15, 2017 (Year: 2017).*
(Continued)

Primary Examiner — Charles R Nold
(74) Attorney, Agent, or Firm — NKL Law; Allen Xue

(57) ABSTRACT

A preparation method of the starch-containing microsphere includes the steps of first reacting starch with a low concentration of epichlorohydrin, and then reacting the resultant product with a surfactant, followed by final crosslinking to give microspheres. The starch-containing microspheres thus prepared are polydisperse starch-containing microspheres with a uniform particle size distribution, with the particle size being in a range of 0.1-500 μm.

13 Claims, 3 Drawing Sheets

(30) Foreign Application Priority Data

| Aug. 22, 2017 | (CN) | 201710720851.7 |
| Aug. 22, 2017 | (CN) | 201710720862.5 |
| Aug. 22, 2017 | (CN) | 201710720863.X |
| Aug. 22, 2017 | (CN) | 201710720864.4 |

(51) Int. Cl.
- *C09K 8/42* (2006.01)
- *E21B 21/00* (2006.01)
- *E21B 33/13* (2006.01)
- *E21B 33/138* (2006.01)

(56) References Cited

U.S. PATENT DOCUMENTS

| 8,153,740 B2 | 4/2012 | Nguyen-Kim et al. |
| 9,512,349 B2 | 12/2016 | Alwattari |
| 2004/0068039 A1 | 4/2004 | Lyoo et al. |
| 2004/0094299 A1 | 5/2004 | Jones |
| 2006/0183822 A1 | 8/2006 | Nguyen-Kim et al. |

FOREIGN PATENT DOCUMENTS

| CN | 103410486 A | 11/2013 |
| CN | 104004134 A | 8/2014 |
| CN | 104761691 A | 7/2015 |
| CN | 104785179 A | 7/2015 |
| CN | 106389345 A | 2/2017 |
| CN | 106749921 A | 5/2017 |
| CN | 107129560 A | 9/2017 |
| CN | 107868627 A | 4/2018 |
| GB | 816049 | 7/1959 |
| WO | 89003674 A1 | 5/1989 |
| WO | 03035793 A | 5/2003 |

OTHER PUBLICATIONS

CN 107325304 Nov. 7, 2017 (Year: 2017).*
CN 101225145 Jul. 23, 2008 (Year: 2008).*
CN 102443186 May 9, 2012 (Year: 2012).*
CN 108239137 Jul. 3, 2018 (Year: 2018).*
Kang, Xiaomei et al.; Synthesis, Structure and Performance of Starch Microspheres; Materials Reports B, Aug. 2011, vol. 25, No. 8, pp. 16-26.
Elkatatny, Salaheldin: "Enhancing the Rheological Properties of Water-Based Drilling Fluid Using Micronized Starch", Arabian Journal for Science and Engineering, Springer Berlin Heidelberg, Berlin/Heidelberg, vol. 44, No. 6, Jan. 16, 2019, pp. 5433-5442, XP036811121.

* cited by examiner

STARCH-CONTAINING MICROSPHERE AND PREPARATION METHOD AND USE THEREOF

FIELD

The present disclosure belongs to the technical field of microspheres, and particularly relates to a starch-containing microsphere and a preparation method and use thereof.

BACKGROUND

The shielding temporary plugging protective oil-gas reservoir drilling technology (shielding temporary plugging technology for short) is mainly used for solving the problem of protection of oil-gas reservoir in an open hole section of a multi-pressure stratum system stratum, namely two adverse factors (pressure difference and drilling fluid solid-phase particles) which damage the oil-gas reservoir in the process of drilling the oil-gas reservoir are utilized and converted into the favorable factors for protecting the oil-gas reservoir, in order to reduce the damage of the drilling fluid, cement paste, the pressure difference and the soaking time to the oil-gas reservoir.

The basic concept of the shielding temporary blocking protective oil-gas reservoir drilling technology is that when a oil-gas reservoir is drilled, the difference formed between the pressure of a drilling fluid column and the pressure of the oil-gas reservoir forces solid particles (temporary blocking agent) artificially added in the drilling fluid to enter the pore throat of the oil-gas reservoir in a very short time, a blocking zone is formed quickly, shallowly and effectively near the well wall, the drilling fluid is prevented from continuously invading the oil-gas reservoir, and the damage of the drilling fluid to the oil-gas reservoir is reduced. The thickness of the plug zone must be substantially less than the depth of the perforations in order to unblock the zone through the perforations during production of the well completion.

The microsphere compound is commonly used as a temporary plugging agent for protecting oil-gas reservoirs at present, and starch-containing microspheres are widely researched. The prior art has more researches on monodisperse or polydisperse starch-containing microspheres, and CN201010546156.1 and CN201410236878.5 disclose two preparation methods of monodisperse starch-containing microspheres. CN201510151917.6 discloses a preparation method of nano-scale polydisperse starch-containing microspheres. CN201510175382.6 provides a method for preparing polymer microspheres with a particle size gradient characteristic.

CN 107129560A discloses a method for preparing a granular temporary plugging agent, which comprises the steps: firstly stirring and mixing corn starch, pachyman and the like, dripping sodium hydroxide solution at a low temperature to react, dripping chloroacetic acid solution, then heating and mixing and filtering, dialyzing the filtrate, concentrating to obtain concentrated solution, mixing the concentrated solution and absolute ethyl alcohol at a low temperature, then filtering, drying filter residue, mixing with water and the like to obtain mixed solution A, mixing with acrylic acid, ammonia water and the like as raw materials to obtain mixed solution B, adding the mixed solution B into the mixed solution A, adding a surfactant and the like at the same time to obtain viscous liquid, cooling the viscous liquid, standing, drying and crushing. However, the particle temporary plugging agent obtained by the method has good temporary plugging effect when being used in certain stratum and has poor temporary plugging effect when being used in other stratum.

WO03035793A1 discloses a drilling fluid which comprises the use of a starch crosslinked with epoxy chloropropane as a bridging agent, the resulting filter cake being readily removable under very mild conditions.

SUMMARY

Aiming to overcome the defects of the prior art, the present disclosure provides starch-containing microspheres and a preparation method and use thereof, wherein the starch-containing microspheres have the advantages of uniformly distributed polydispersity, low cost, excellent temporary plugging effect when being used in various stratums and the like.

The first aspect of the present disclosure provides a starch-containing microsphere, the starch-containing microspheres have uniformly distributed polydispersity in a particle size concentrated distribution interval, and the particle size distribution in the particle size concentrated distribution interval has the following characteristics: evenly dividing the particle size concentrated distribution interval into n intervals, wherein the proportion of microspheres in each interval is as follows:

$$\frac{100}{n}\% \pm \frac{10}{n}\%$$

wherein n is an integer greater than 1.

The second aspect of the present disclosure provides a method for preparing starch-containing microspheres, which comprises the following steps:
 (1) adding starch into water, then adding a solubilizer, uniformly mixing, and then adding a first cross-linking agent under a cross-linking reaction condition to react;
 (2) adding a zwitterionic surfactant into the feed liquid obtained in step (1), and uniformly mixing;
 (3) adding an solution of inorganic salt and a second cross-linking agent into the feed liquid obtained in step (2) at 30-60° C. to react, wherein the first cross-linking agent and the second cross-linking agent are the same or different.

The present disclosure also provides starch-containing microspheres prepared by the method above and use of the above starch-containing microspheres in an oil-gas reservoir protective temporary plugging agent.

The starch-containing microspheres provided by the present disclosure can have a good effect under the addition of 0.5-5 wt % of the drilling fluid, have good plugging capability in different stratums, can effectively plug pores or microcracks to form compact mud cakes, prevent a large amount of filtrate from permeating into the stratums, and reduce the filtration loss. The reasons are maybe different from monodisperse and polydisperse starch-containing microspheres prepared by the prior art, the starch-containing microspheres of the present disclosure are polydisperse microspheres with uniformly distributed particle sizes, when the starch-containing microspheres are applied in the field of oil-gas reservoir protective temporary plugging agent, the porosity span in the reservoirs is large because of the different geological structures, the monodisperse particle size microspheres alone are difficult to meet the broad-spectrum requirement, the use effect could not meet the industrial requirement. In addition, the existing multi-dispersed microspheres are in normal distribution, the effective range of the particle size is narrow, and the effect is obviously limited. The uniformly distributed polydisperse starch-containing microspheres provided by the present disclosure can well solve the problems, namely, the microspheres have equivalent proportion in any particle size interval, high microsphere content and obvious temporary plugging effect, and can meet the general requirements.

The starch-containing microspheres with the polydispersity of uniform particle size distribution (namely, the proportion of the microspheres is equivalent in any particle size interval) can be prepared by the method for preparing the starch-containing microspheres of the present disclosure, and the reason is probably because the straight chain part of the starch have a structure size equivalent to that of the branched chain part of the starch, and have similar molecular sizes, as a result of the combined action of triethanolamine and epoxy chloropropane, especially the operation mode of adding the epoxy chloropropane in two steps, so that the prepared microspheres are easier to control, and the particle size distribution is uniform. Then in the process of cross-linking starch into microspheres, by using a zwitterionic surfactant and slowly adding inorganic salt and epoxy chloropropane at a uniform speed, under their combined action, the particle size of the prepared starch-containing microspheres vary linearly, thus to obtain the polydisperse starch-containing microspheres with uniformly distributed particle size. Monomers (comprising one or more of cationic monomers, anionic monomers, zwitterionic monomers and non-ionic monomers) are added in the method for preparing the starch-containing microspheres to carry out copolymerization modification on the starch, so that the performances of the microspheres such as salt resistance, temperature resistance, inhibition of core hydration dispersion, namely wellbore stabilization and the like are remarkably improved.

DETAILED DESCRIPTION

The endpoints of the ranges and any values disclosed herein are not limited to the precise range or value, and these ranges or values should be understood to encompass values close to these ranges or values. For numerical ranges, endpoints of each range, and individual point values can be combined with each other to give one or more new numerical ranges, and such numerical ranges should be construed as specifically disclosed herein.

Figure 1:
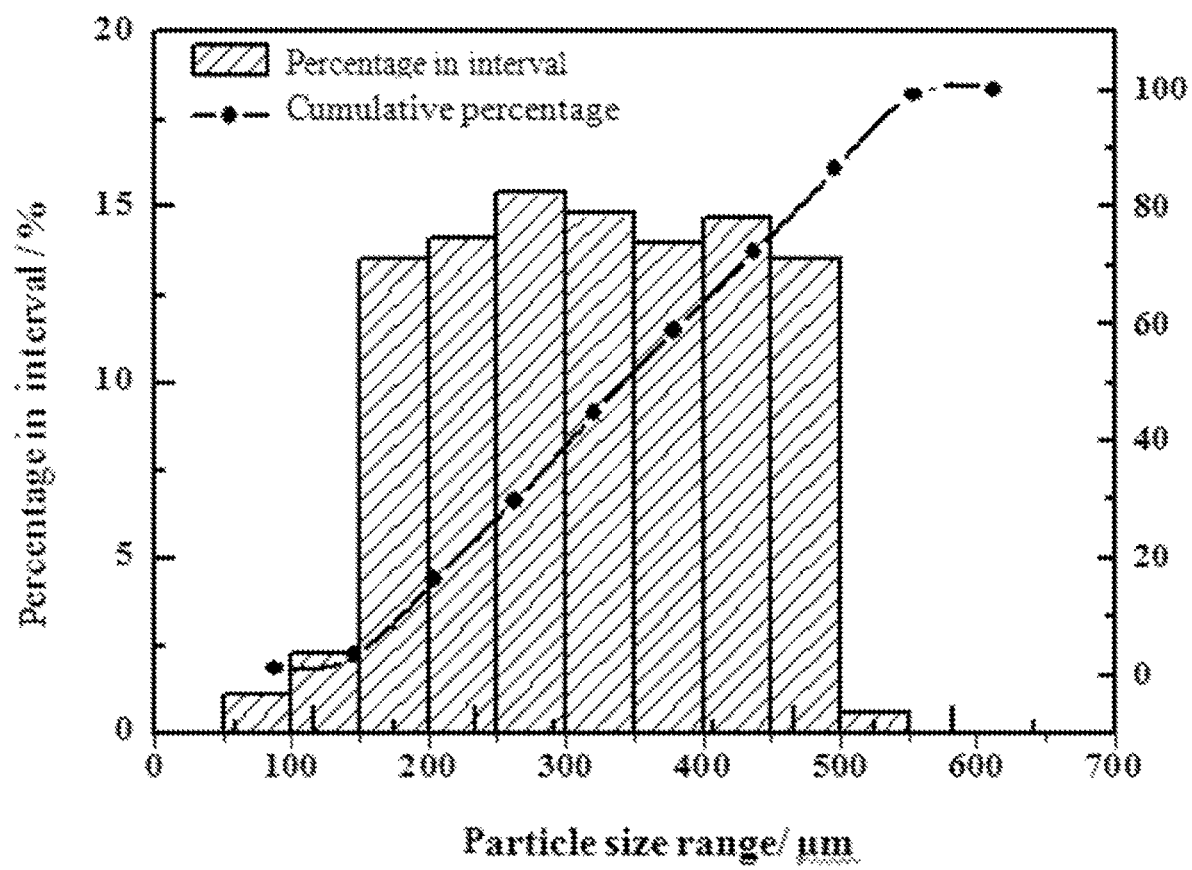
FIG. 1 is a graph of the particle size distribution of starch-containing microspheres of the present disclosure.

In the present disclosure, the uniform particle size distribution means that the number of particles with each particle size is equivalent in the particle size concentrated distribution interval. The particle size concentrated distribution interval is a region where the particle size distribution is approximately linear, and does not include a region having a significant inflection point at both ends, as shown in FIG. 1. This interval can be determined by a particle size distribution chart obtained by a particle size distribution tester.

In the present disclosure, the particle size distribution is measured by a Malvern 3000 particle size analyzer, and the measuring method is wet measurement.

In the present disclosure, in order to conveniently investigate/describe the uniform distribution characteristic of the particle size in the present disclosure, the particles in the particle size concentrated distribution interval are divided into n intervals, wherein n can be any integer larger than 1, and as a result, the proportion of the starch-containing microspheres in each interval is almost the same and is:

$$\frac{100}{n}\% \pm \frac{10}{n}\%$$

In order to reduce unnecessary testing and statistical work, n is preferably an integer between 4 and 10 in the examples of the present disclosure.

In the present disclosure, the controllable range of the particle size of the starch-containing microspheres is 0.1-500 μm, for example 0.1-5 μm, 20-260 μm, 50-300 μm and 150-500 μm. Namely, in the particle size range, the proportion of the starch-containing microspheres in each particle size interval in the particle size concentrated distribution interval meets the requirement. According to a specific embodiment of the present disclosure, the starch microspheres have a particle size distribution of any one or more of the following: the particle size concentrated distribution interval is 10-170 μm, n is 4, and the proportion of the microspheres in each interval is 24.5%-25.5%; the particle size concentrated distribution interval is 120-400 μm, n is 4, and the proportion of the microspheres in each interval is 24.5%-25.5%; the particle size concentrated distribution interval is 50-300 μm, n is 5, and the proportion of the microspheres in each interval is 18.5%-21.5%; the particle size concentrated distribution interval is 150-500 μm, n is 7, and the proportion of the microspheres in each interval is 13.5%-15.5%; the particle size concentrated distribution interval is 0.7-3.7 μm, n is 6, and the proportion of the microspheres in each interval is 15.5%-17.5%; the particle size concentrated distribution interval is 70-270 μm, n is 5, and the proportion of the microspheres in each interval is 18.5-21.0%; the particle size concentrated distribution interval is 20-260 μm, n is 6, and the proportion of the microspheres in each interval is 15.0%-18.0%; the particle size concentrated distribution interval is 0.1-4.9 μm, n is 6, and the proportion of the microspheres in each interval is 15.5-18.0%.

Figure 2:
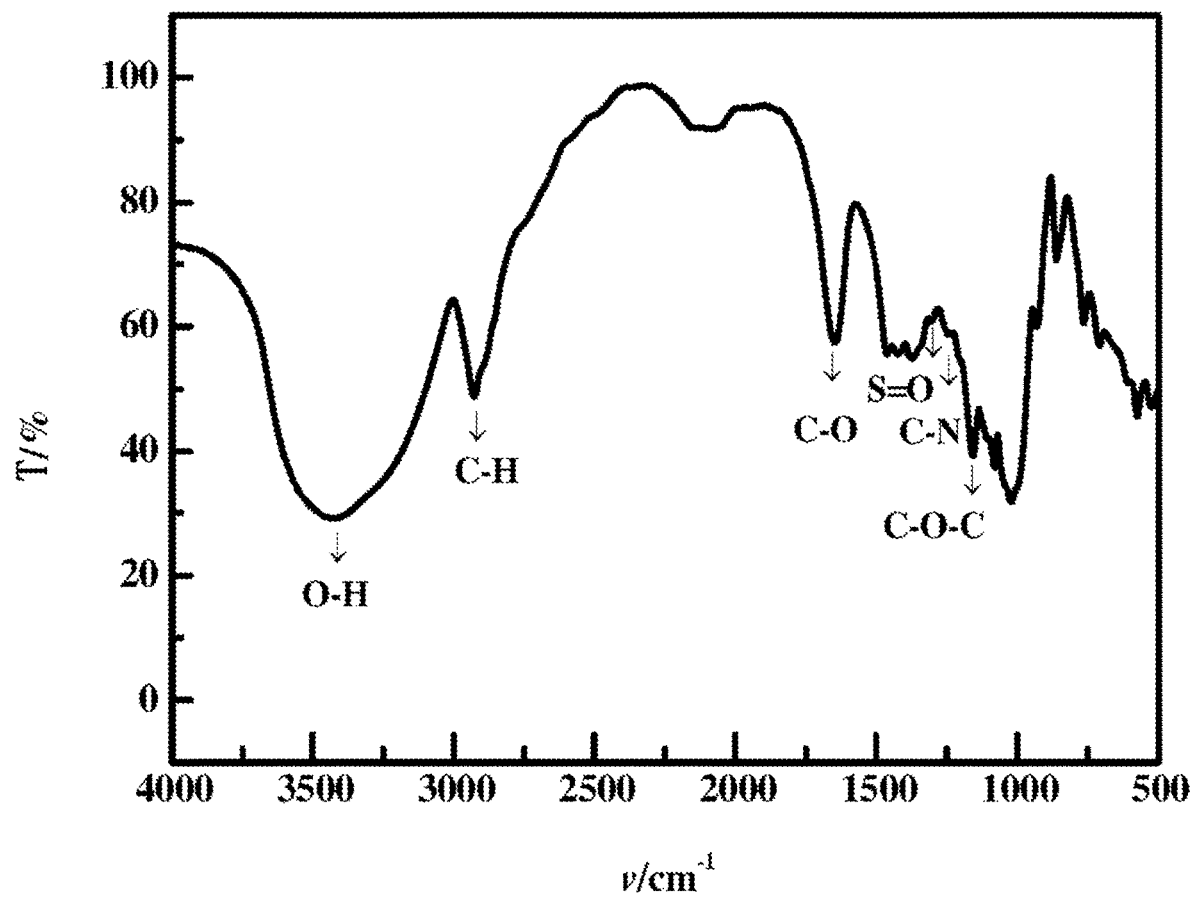
FIG. 2 is an infrared spectrum of the starch-containing microspheres of the present disclosure.
Figure 3:
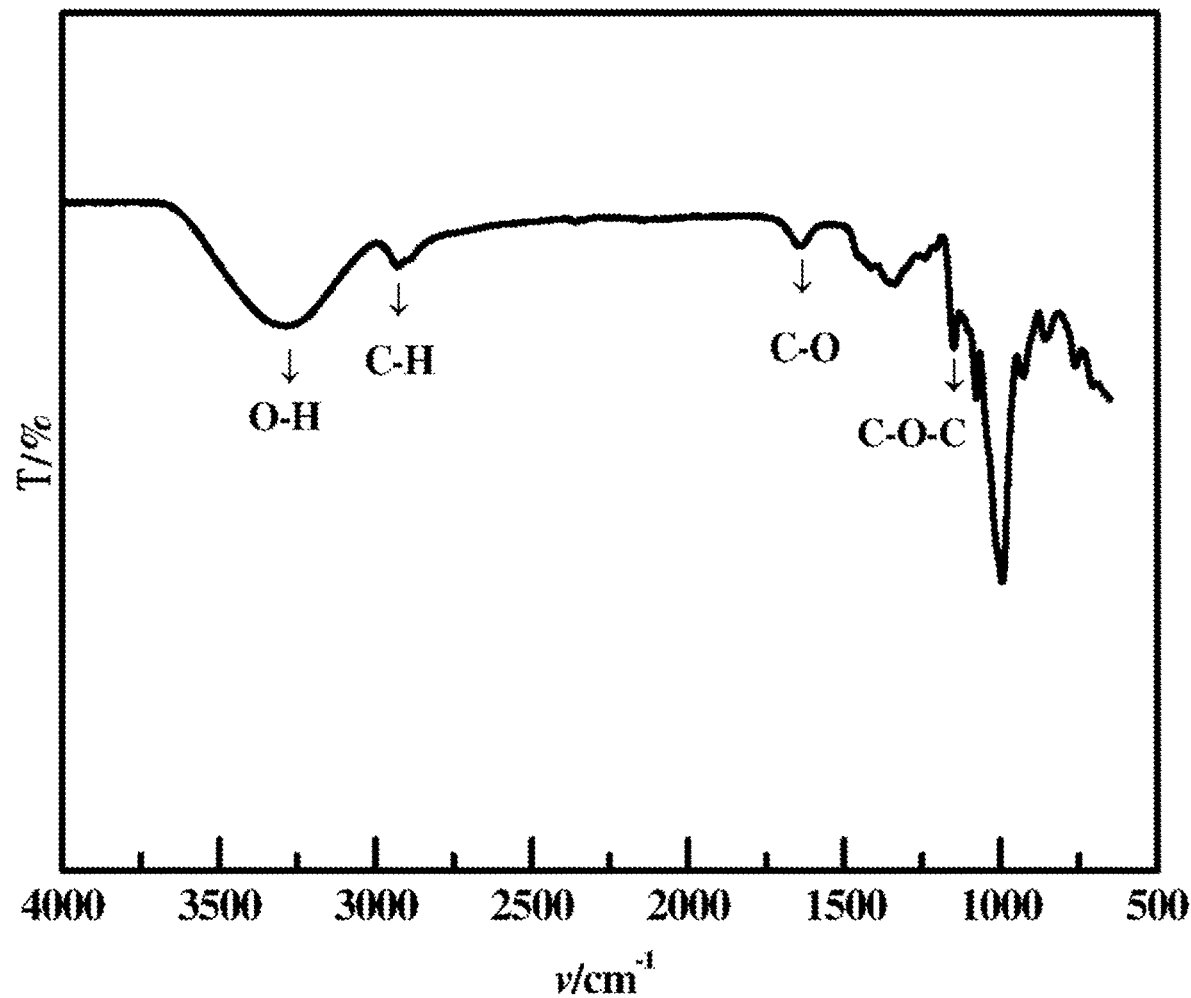
FIG. 3 is an infrared spectrum of a starch feedstock used in an example of the present disclosure.

In the present disclosure, as shown in FIG. 2, the infrared spectrum of the starch-containing microspheres has a small peak near 1025-1250 $cm^{-1}$, which is assigned to a C—N vibration characteristic peak, and has a characteristic peak near 1150-1350 $cm^{-1}$, which is similar to the C—N characteristic peak in strength, assigned to the stretching vibration of S=O double bonds. The infrared spectrum of the starch raw material is shown in FIG. 3, and no characteristic peak exists at the above two positions.

The infrared spectrum of the present disclosure was obtained by analysis on a Frontier type Fourier transform infrared spectrometer manufactured by Perkin-Elmer.

Preferably, the starch-containing microspheres of the present disclosure comprise a zwitterionic surfactant with the following structural formula:

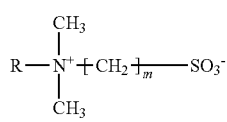

wherein: m is an integer of 2-6, preferably m is 3 or 4; R is a saturated carbon chain having 1-18 carbon atoms, preferably 12-18 carbon atoms. Preferably, except for terminal carbon atom, the carbon chain of the zwitterionic surfactant contains a mono-substituted functional group. The group may be a hydroxyl group, an amino group or a carboxyl group. That is, R is preferably a saturated carbon chain having 1-18 carbon atoms, preferably 12-18 carbon atoms, having a hydroxyl group, an amino group or a carboxyl group as a substituent on one or more carbon atoms except for terminal carbon atoms. Particularly preferably, the zwitterionic surfactant is selected from one or more of dimethyldodecylsulfopropyl ammonium salt, dimethylhexadecylsulfoethyl ammonium salt, dimethyloctadecylsulfobutyl ammonium salt, dimethyl (3-hydroxydodecyl) sulfopropyl ammonium salt, dimethyl (6-aminotetradecyl) sulfoethyl ammonium salt.

The starch-containing microspheres mainly contain constitutional units derived from starch, wherein the content of the constitutional units derived from starch is not less than 35-95 wt %, and preferably 38-85 wt %. In order to further improve the temperature resistance and salt resistance of the starch-containing microspheres when used in a drilling fluid, the starch-containing microspheres preferably further comprise constitutional units derived from polymerizable monomer, wherein the polymerizable monomer is at least one of an anionic monomer, a cationic monomer, a nonionic monomer and a zwitterionic monomer. Preferably, the constitutional units derived from polymerizable monomer form a graft copolymer with constitutional units derived from starch.

Preferably, the zwitterionic monomer is selected from one or more of DMAPS (methacryloyloxyethyl-N, N-dimethyl propane sulfonate), DAPS (N, N-dimethyl allyl amine propane sulfonate), VPPS (4-vinylpyridine propane sulfonate), MAPS (N-methyl diallyl propane sulfonate) and MABS (N-methyl diallyl butane sulfonate); the cationic monomer is one or more of DMC (methacryloyloxyethyl trimethyl ammonium chloride), DAC (acryloyloxyethyl trimethyl ammonium chloride), DBC (acryloyloxyethyl dimethyl benzyl ammonium chloride), DMDAAC (dimethyl diallyl ammonium chloride) and DEDAAC (diethyl diallyl ammonium chloride); the anionic monomer is one or more of AA (acrylic acid), AMPS (2-methyl-2-acrylamidopropanesulfonic acid), FA (fumaric acid), SSS (sodium allylsulfonate) and AOIAS (sodium 2-acryloyloxyisopentene sulfonate); the nonionic monomer is one or more of NVP (N-vinyl pyrrolidone), AN (acrylonitrile), NVF (vinyl formamide) and NVA (vinyl acetamide). The above-mentioned polymeric monomers are commercially available.

According to a particularly preferred embodiment of the present disclosure, the starch-containing microspheres further comprise a constitutional unit derived from starch and at least one of a cross-linking agent constitutional unit and a constitutional unit derived from polymerizable monomer, and the content of the constitutional unit derived from starch is 35-95 wt %, preferably 36.6-90.4 wt %, more preferably 38-85 wt %, and still more preferably 39.6-82.7 wt %, based on the total amount of the starch-containing microspheres. The content of the constitutional unit derived from polymerizable monomer is 0-50 wt %, preferably 5-45.2 wt %, and the content of the crosslinking agent constitutional unit is 6-35 wt %, preferably 5-30 wt %, more preferably 8.2-26.7 wt %. Preferably, the content of the constitutional unit derived from starch is 39.6 wt %-82.7 wt %, the content of the constitutional unit derived from polymerizable monomer is 8.3 wt %-36.6 wt %, and the content of the crosslinking agent constitutional unit is 9.4 wt %-20.6 wt %. The starch-containing microspheres with the preferred components exhibit better salt resistance and temperature resistance.

In the present disclosure, the constitutional unit derived from starch refers to a constitutional unit provided by starch in the starch-containing microsphere, and the constitutional unit derived from polymerizable monomer refers to a constitutional unit provided by a polymerizable monomer in the starch-containing microsphere. Wherein the presence of each constitutional unit can be determined by fourier infrared spectroscopy. The content of the constitutional unit can be calculated by the material feeding amount.

The present disclosure provides a preparation method of the starch-containing microspheres, which comprises the following steps:
(1) adding starch into water, then adding a solubilizer, uniformly mixing, and then adding a first cross-linking agent under a cross-linking reaction condition to react;
(2) adding a zwitterionic surfactant into the feed liquid obtained in step (1), and uniformly mixing;
(3) adding an solution of inorganic salt and a second cross-linking agent into the feed liquid obtained in step (2) at 30-60° C. to react, wherein the first cross-linking agent and the second cross-linking agent are the same or different.

According to the preferred embodiment of the present disclosure, the method further comprises step (1-1) between step (1) and step (2): adding a polymerizable monomer and an initiator to undergo copolymerization reaction. That is, a polymerizable monomer is added into the solution obtained in step (1), fully dissolved and uniformly mixed, then an initiator is added to react at 60-80° C. for 3-6 h, and a zwitterionic surfactant was added to perform step (2). The prepared starch-containing microspheres exhibit better temperature resistance, salt resistance, well wall stability and the like.

The polymerizable monomer may be one or more of a cationic monomer, an anionic monomer, a zwitterionic monomer, and a nonionic monomer, as described above. The details have been described above, and are not described herein again.

The initiator may be a persulfate type initiator, for example any one or more of potassium persulfate, sodium persulfate, ammonium persulfate.

The conditions for the copolymerization reaction with the polymerizable monomer include that the temperature is preferably 30-80° C., the time is preferably 2-8 hours, and the temperature is further preferably 45-65° C., and the time is further preferably 3-5 hours.

In the present disclosure, the weight ratio of starch to water may be 1-20:100, preferably 5-15:100.

In the present disclosure, the starch is one or more of mung bean starch, cassava starch, ipomoea batatas starch, sweet potato starch, wheat starch, water caltrop starch, lotus root starch and corn starch, and preferably corn starch and/or potato starch.

In the present disclosure, water is preferably deionized water.

In the present disclosure, the solubilizer may be any of various substances capable of increasing the solubility/swelling property of starch in water in order to improve the degree of contact between starch and water and to prevent starch from aggregating, preferably a substance containing hydroxyl and tertiary N and having 1-10 carbon atoms, more preferably one or more of trimethanolamine triethanolamine, tripropanolamine, N,N-bisdiethanol amine, isopropanolamine, and diglycolamine, and particularly preferably the solubilizer is triethanolamine.

In the present disclosure, the weight ratio of the starch to the solubilizer is 1-20:10-50, preferably 5-15:20-40.

In the present disclosure, preferably the starch contacts with water and the solubilizer at 20-80° C., further preferably at 30-60° C.

In the present disclosure, the first cross-linking agent and the second cross-linking agent are the same or different, and are each independently one or more of epoxy chloropropane, N,N-methylene-diallylamine, phosphorus oxychloride, sodium trimetaphosphate, adipic acid and sodium hexametaphosphate. Preferably, the first crosslinking agent and the second crosslinking agent are the same. From the viewpoint of crosslinking efficiency, it is preferable that both the first crosslinking agent and the second crosslinking agent are epoxy chloropropane.

The conditions of the crosslinking reaction in step (1) includes that the temperature is preferably 20-80° C., the time is preferably 0.5-4 hours, the temperature is further preferably 30-60° C., and the time is further preferably 1-3 hours.

In the present disclosure, the kind of the zwitterionic surfactant is as described above, and is not described in detail herein. The amount of the zwitterionic surfactant is 0.05-10 parts by weight relative to 1-20 parts by weight of starch, and is preferably 1-6 parts by weight relative to 5-15 parts by weight of starch.

The mixing conditions in step (2) include that the temperature is preferably 20-80° C. and the time is preferably 0.5-6 hours, and the temperature is further preferably 30-50° C. and the time is further preferably 1-3 hours.

The reaction temperature in step (3) can be 20-80° C., preferably 30-60° C.

In step (3), the solution of inorganic salt and the second cross-linking agent are simultaneously added into the reaction system, and added slowly at a constant speed, preferably dropwise added at a constant speed. The dripping is kept for 2-20 hours, preferably 5-15 hours.

The amount of the solution of inorganic salt is 0.5-200 parts by weight relative to 1-20 parts by weight of the starch, and preferably 50-150 parts by weight relative to 5-15 parts by weight of the starch. Wherein the content of the inorganic salt solute is 0.025-50 parts by weight, preferably 0.5-30 parts by weight.

In the present disclosure, the inorganic salt may be various soluble inorganic salts, for example, the inorganic salt may be one or more of sodium salt, potassium salt, ammonium salt, calcium salt, and magnesium salt. When the inorganic salt is a sodium salt, it may specifically be one or more of sodium chloride, sodium bromide, sodium sulfate, sodium sulfite, sodium carbonate, sodium bicarbonate, sodium nitrate, sodium phosphate, sodium hydrogen phosphate, and sodium silicate. When the inorganic salt is a potassium salt, it may specifically be one or more of potassium chloride, potassium bromide, potassium sulfate, potassium sulfite, potassium carbonate, potassium bicarbonate, potassium nitrate, potassium phosphate, potassium hydrogen phosphate, and potassium silicate. When the inorganic salt is an ammonium salt, it may specifically be one or more of ammonium chloride, ammonium bromide and ammonium nitrate. When the inorganic salt is a calcium salt, it may be specifically calcium chloride and/or calcium bromide. When the inorganic salt is a magnesium salt, the inorganic salt may be one or more of magnesium chloride, magnesium bromide, magnesium sulfate and magnesium nitrate.

The total amount of the first crosslinking agent and the second crosslinking agent is 0.105-14.6 parts by weight relative to 1-20 parts by weight of starch, and preferably 1.04-7.8 parts by weight relative to 5-15 parts by weight of starch.

In step (3), continuing to react for 1-5 hours, preferably 1.5-3 hours after the dripping is finished.

After step (3) is finished, further performing solid-liquid separation as needed (such as considering the long-distance transportation of the product), and drying the solid obtained by separation to obtain a solid starch-containing microsphere product. The drying is performed under conditions including a temperature of 30-110° C. and a time of 2-12 hours, preferably a temperature of 40-80° C. and a time of 5-9 hours.

According to one embodiment of the present disclosure, the raw materials for preparing the starch-containing microspheres comprise the following components, in parts by weight: 100 parts of deionized water, 1-20 parts of starch, 10-50 parts of triethanolamine, 0.105-14.6 parts of epoxy chloropropane, 0.05-10 parts of a zwitterionic surfactant and 0.5-200 parts of an solution of inorganic salt, wherein the inorganic salt solute accounts for 0.025-50 parts. Preferably, the raw materials of the starch-containing microspheres comprise the following components, in parts by weight: 100 parts of deionized water, 5-15 parts of starch, 20-40 parts of triethanolamine, 1.04-7.8 parts of epoxy chloropropane, 1-6 parts of zwitterionic surfactant and 50-150 parts of solution of inorganic salt, wherein the inorganic salt solute accounts for 0.5-30 parts.

According to another embodiment of the present disclosure, the raw material containing starch microspheres further comprises an initiator and a monomer, and the raw material of containing starch microspheres comprises the following components, in parts by weight: 100 parts of deionized water, 1-20 parts of starch, 10-50 parts of triethanolamine, 0.105-14.6 parts of epoxy chloropropane, 0.05-10 parts of zwitterionic surfactant, 0.1-20 parts of monomer, 0.001-0.2 part of initiator and 0.5-200 parts of solution of inorganic salt, wherein the inorganic salt solute accounts for 0.025-50 parts; preferably 100 parts of deionized water, 5-15 parts of starch, 20-40 parts of triethanolamine, 1.04-7.8 parts of epoxy chloropropane, 1-6 parts of zwitterionic surfactant, 5-15 parts of monomer, 0.02-0.105 part of initiator and 50-150 parts of solution of inorganic salt, wherein the inorganic salt solute accounts for 0.5-30 parts.

According to one embodiment of the method for preparing starch-containing microspheres provided by the present disclosure, the preparation method comprises the following steps:
(1) weighing a certain amount of starch, adding the starch into water, adding a certain amount of triethanolamine, uniformly mixing at 20-80° C., and adding epoxy chloropropane to react;
(2) adding a zwitterionic surfactant into the feed liquid obtained in step (1), and uniformly mixing;
(3) slowly adding an solution of inorganic salt and epoxy chloropropane into the feed liquid obtained in step (2) at a constant speed at 30-60° C., and continuing to react after the addition of solution of inorganic salt and the epoxy chloropropane is finished, to obtain starch-containing microspheres.

The deionized water, the starch, the triethanolamine, the epoxy chloropropane, the zwitterionic surfactant and the solution of inorganic salt respectively have the following dosages, in parts by weight: 100 parts of deionized water, 1-20 parts of starch, 10-50 parts of triethanolamine, 0.105-14.6 parts of epoxy chloropropane, 0.05-10 parts of zwitterionic surfactant and 0.5-2000 parts of solution of inorganic salt, preferably 0.5-120 parts of solution of inorganic salt, wherein the inorganic salt solute accounts for 0.025-50 parts, preferably 0.025-30 parts; preferably 100 parts of deionized water, 5-15 parts of starch, 20-40 parts of triethanolamine, 1.04-7.8 parts of epoxy chloropropane, 1-6 parts of zwitterionic surfactant and 50-150 parts of solution of inorganic salt, preferably 50-100 parts of solution of inorganic salt, wherein the inorganic salt solute accounts for 0.5-30 parts, preferably 2.5-25 parts.

In the method, the amount of the epoxy chloropropane in step (1) is 0.005-0.6 parts, preferably 0.04-3 parts.

In the method, the amount of the epoxy chloropropane in step (3) is 0.1-14 parts, preferably 1-7.5 parts.

According to another mode of the present disclosure, when monomers and initiators are included in the starch feedstock, the preparation method comprises the following steps:

(1) weighing a certain amount of starch, adding the starch into water, then adding a certain amount of triethanolamine, fully and uniformly mixing at 20-80° C., and then adding epoxy chloropropane to react;

(1-1) adding a monomer into the solution obtained in step (1), fully dissolving and uniformly mixing, adding an initiator, and performing reaction at 60-80° C. for 3-6 hours;

(2) adding a zwitterionic surfactant into the feed liquid obtained in step (1-1), and uniformly mixing;

(3) slowly adding an solution of inorganic salt and epoxy chloropropane into the feed liquid obtained in step (2) at a constant speed at 30-60° C., and continuing to react after the addition of the solution of inorganic salt and the epoxy chloropropane is finished, to obtain the starch-containing microspheres.

In step (1-1), the monomer can be one or more of a cationic monomer, an anionic monomer, a zwitterionic monomer and a nonionic monomer. The details have been described above and will not be described herein.

The present disclosure also provides starch-containing microspheres prepared by the method above and use of the starch-containing microspheres in the oil-air reservoir protective temporary plugging agent.

The particle size of the starch-containing microspheres prepared by the method above has uniformly distributed polydispersity in a particle size concentrated distribution interval, and the particle size distribution in the particle size concentrated distribution interval has the following characteristics: evenly dividing the particle size concentrated distribution interval into n intervals, wherein the proportion of microspheres in each interval is as follows:

$$\frac{100}{n}\% \pm \frac{10}{n}\%$$

wherein n is an integer greater than 1, preferably n is an integer between 4 and 10. The controllable particle size range of starch-containing microspheres is 0.1-500 μm.

The infrared spectrum of the starch-containing microspheres has small peaks near 1025-1250 cm$^{-1}$, and the peaks are assigned to C—N vibration characteristic peaks, and have characteristic peaks near 1150-1350 cm$^{-1}$, which is similar to the C—N characteristic peak in strength, assigned to stretching vibration of S=O double bonds. The starch-containing microspheres are used as a component in a drilling fluid system, and play a role in shielding and temporary plugging. The dosage of the starch-containing microspheres can be 0.5-5 wt % based on the total amount of the drilling fluid system.

The starch-containing microspheres of the present disclosure, and the method and use of the same, are further described below by way of specific examples, which are not intended to be limiting.

The particle size of the starch-containing microspheres in the examples of the present disclosure is measured by a Malvern 3000 particle size analyzer, and the measuring method is wet measurement. And a cross-linking structure and a graft polymerization structure are determined by using a Frontier type Fourier transform infrared spectrometer of Perkin-Elmer, and the content of each constitutional unit in the starch-containing microspheres is calculated by the feeding amount.

The particle size ranges (a μm-b μm) in all the following examples and comparative examples are intended to mean a≤D<b, D refers to the diameter of the particular starch particle, i.e. when the two ranges have coinciding endpoints, the endpoint belongs to the latter range and not to the former range.

In all the following examples and comparative examples, parts are expressed as parts by weight and "%" is expressed as "wt %". Unless otherwise specified, the temperature and pressure therein mean ambient temperature (20-25° C.) and pressure (1.0 atm) or autogenous pressure under closed conditions.

In the following examples, the amphoteric cationic surfactant and the polymerizable monomer are commercially available.

Examples 1-1 to 1-5 and Comparative Examples 1-1 to 1-4 are intended to illustrate the preparation of starch-containing microspheres without addition of polymerizable monomers.

Example 1-1

15 parts of mung bean starch were weighed and added into 100 parts of deionized water, then 40 parts of triethanolamine was added, and they were fully dissolved at 60° C. Then 0.6 part of epoxy chloropropane was added, and reacted for 1.5 hours after being mixed. 4.5 parts of dimethyl (3-hydroxydodecyl) sulfopropyl ammonium salt (sinopharma chemical reagent co. Ltd.) was added thereto and mixed well. 105 parts of solution of inorganic salt was prepared with 30 parts of $K_2SO_4$, and the solution of inorganic salt and 5.7 parts of epoxy chloropropane are simultaneously dripped into the starch solution at 30° C., and the dripping at a constant speed was kept for 7 h. And continuously reacted for 2 hours after the dropwise adding was finished to obtain the uniformly distributed polydisperse starch-containing microspheres, wherein the content of the constitutional unit derived from starch was 70.4 wt %. The particle size distribution is shown in FIG. 1, wherein the particle size concentrated distribution interval of the starch-containing microspheres is 150-500 μm (96.0% of the particle size is in the interval), and the particle size distribution in the particle size concentrated distribution interval has the following characteristics: (150 μm-200 μm): 13.8%; (200 μm-250 μm): 13.9%; (250μ-300 μm): 15.4%; (300 μm-350 μm): 14.8%; (350 μm-400 μm): 14.2%; (400 μm-450 μm): 13.7%; (450-500 μm): 14.2%; and (150-185 μm): 10.2%; (185-220 μm): 9.1%; (220 μm-255 μm): 9.9%; (255 μm-290 μm): 9.8%; (290-325 μm): 10.1%; (325-360 μm): 10.3%; (360-395 μm): 10.0%; (395-430 μm): 9.8%; (430 μm-465 μm): 10.1%; (465 μm-500 μm): 10.7%. Wherein the infrared spectrum is shown in FIG. 2, and C—N peak and S═O peak exist. The infrared spectrum of the starch raw material is shown in FIG. 3, and C—N peak and S═O peak do no exist.

Example 1-2

10 parts of corn starch were weighed and added into 100 parts of deionized water, then 10 parts of triethanolamine was added, and they were fully dissolved at 80° C. Then 0.005 part of epoxy chloropropane was added, and reacted for 3 hours after being mixed. 6 parts of dimethyldodecylsulfopropyl ammonium salt (sinopharma chemical reagent co. Ltd.) was added thereto and mixed well. 200 parts of inorganic salt aqueous solution was prepared with 50 parts of NaCl, the inorganic salt aqueous solution and 1 part of epoxy chloropropane were simultaneously dripped into the starch solution at 50° C., wherein the dripping at a constant speed was kept for 5 h. And continuously reacted for 2 h after the dropwise adding was finished to obtain the uniformly distributed polydisperse starch-containing microspheres, wherein the content of the constitutional unit derived from starch is 90.8 wt %. The starch-containing microspheres have a particle size concentrated distribution interval of 50-210 μm (95.1% of particle sizes are in the interval), and the particle size distribution in the particle size concentrated distribution interval has the following characteristics: (50 μm-90 μm): 25.4%; (90-130 μm): 25.1%; (130 μm-170 μm): 24.6%; (170 μm-210 μm): 24.9%; and (50 μm-70 μm): 13.4%; (70 μm-90 μm): 12.0%; (90-110 μm): 13.7%; (110 μm-130 μm): 11.4%; (130 μm-150 μm): 12.3%; (150 μm-170 μm): 12.3%; (170 μm-190 μm): 13.6%; (190 μm-210 μm): 11.3%. Wherein the infrared spectrum is similar to that of FIG. 2, and a C—N peak and an S═O peak exist.

Example 1-3

5 parts of potato starch was weighed and added into 100 parts of deionized water, and then 31 parts of triethanolamine was added, and they were fully dissolved at room temperature. Then 0.04 epoxy chloropropane was added, and reacted for 2 hours after being mixed. 1 part of dimethylhexadecylsulfoethylammonium salt (sinopharma chemical reagent co. Ltd) was added thereto and mixed well. 58 parts of solution of inorganic salt was prepared with 0.5 part of CaCl$_2$, and the solution of inorganic salt and 7.5 parts of epoxy chloropropane were simultaneously dripped into the starch solution at 60° C., and the dripping at uniform speed was kept for 8 hours. And continuously reacted for 2 hours after the dropwise adding was finished to obtain the uniformly distributed polydisperse starch-containing microspheres, wherein the content of the constitutional unit derived from starch was 39.8 wt %. The starch-containing microspheres have a particle size concentrated distribution interval of 70-350 μm (92.2% of particle sizes are in the interval), and the particle size distribution in the particle size concentrated distribution interval has the following characteristics: (70 μm-140 μm): 24.5%; (140 μm-210 μm): 26%; (210 μm-280 μm): 25.1%; (280 μm-350 μm): 24.4%; and (70 μm-110 μm): 14.5%; (110 μm-150 μm): 15.2%; (150-190 μm): 14.9%; (190-230 μm): 15.0%; (230 μm-270 μm): 13.9%; (270-310 μm): 15.2%; (310 μm-350 μm): 11.3%. Wherein the infrared spectrum is similar to that of FIG. 2, and a C—N peak and an S═O peak exist.

Example 1-4

20 parts of cassava starch was weighed and added into 100 parts of deionized water, and then 20 parts of triethanolamine was added, and they were fully dissolved at 40° C. Then 0.3 part of epoxy chloropropane was added, and the mixture reacted for 1 hour after being mixed. 10 parts of dimethyloctadecyl sulfobutylammonium salt (sinopharma chemical reagent co. Ltd) was added thereto and mixed thoroughly. 150 parts of solution of inorganic salt was prepared with 21 parts of MgCl$_2$, the solution of inorganic salt and 14 parts of epoxy chloropropane were simultaneously dripped into the starch solution at 40° C., and the dripping at a constant speed was kept for 10 hours. And continuously reacted for 2 hours after the dropwise adding was finished. Then filtered, and dried at 80° C. for 5 hours to obtain uniformly distributed polydisperse starch-containing microspheres, wherein the content of the constitutional unit derived from starch was 58.3 wt %. The starch-containing microspheres have a particle size concentrated distribution interval of 50-300 μm (93.7% of particle sizes are in the interval), and the particle size distribution in the particle size concentrated distribution interval has the following characteristics: (50 μm-100 μm): 19.4%; (100 μm-150 μm): 18.8%; (150 μm-200 μm): 21%; (200 μm-250 μm): 20.0%; (250 μm-300 μm): 20.8%; and (50 μm-75 μm): 10.2%; (75 μm-100 μm): 9.2%; (100 μm-125 μm): 9.6%; (125-150 μm): 9.7%; (150 μm-175 μm): 11.0%; (175 μm-200 μm): 9.5%; (200 μm-225 μm): 9.8%; (225 μm-250 μm): 10.2%; (250 μm-275 μm): 10.4%; (275-300 μm): 10.4%. Wherein the infrared spectrum was similar to that of FIG. 2, and a C—N peak and an S═O peak exist.

Example 1-5

1 part of sweet potato starch was weighed and added into 100 parts of deionized water, and 50 parts of triethanolamine was added, and they were fully dissolved at 50° C. Then 0.34 part of epoxy chloropropane was added, and the mixture reacted for 2.5 h after be mixed. 0.05 part of dimethyl (6-aminotetradecyl) sulfoethylammonium salt (sinopharma chemical reagent co. Ltd) was added thereto and mixed well. 0.5 part of solution of inorganic salt was prepared with 0.025 part of NaCl, and the solution of inorganic salt and 0.1 part of epoxy chloropropane are simultaneously dripped into the starch solution at 55° C., and the dripping at a constant speed was kept for 9 hours. And continuously reacted for 2 hours after the dropwise adding was finished. Then filtered, and dried at 70° C. for 6.5 hours to obtain the uniformly distributed polydisperse starch-containing microspheres, wherein the content of the constitutional unit derived from starch was 69.4 wt %. The starch-containing microspheres have a particle size concentrated distribution interval of 0.1-1.3 μm (93.5% of the particle size is in the interval), and the particle size distribution in the particle size concentrated distribution interval has the following characteristics: (0.1 μm-0.3 μm): 17.5%; (0.3 μm-0.5 μm): 15.9%; (0.5 μm-0.7 μm): 16.5%; (0.7 μm-0.9 μm): 16.5%; (0.9-1.1 μm): 16.4%;

(1.1-1.3 µm): 17.2%; and (0.1 µm-0.2 µm): 9.1%; (0.2 µm-0.3 µm): 8.2%; (0.3 µm-0.4 µm): 8.6%; (0.4 µm-0.5 µm): 7.5%; (0.5 µm-0.6 µm): 9.0%; (0.6 µm-0.7 µm): 7.5%; (0.7 µm-0.8 µm): 8.8%; (0.8 µm-0.9 µm): 7.7%; (0.9-1.0 µm): 8.2%; (1.0 µm-1.1 µm): 8.2%; (1.1-1.2 µm): 9.0%; (1.2-1.3 µm): 8.2%. Wherein the infrared spectrum is similar to that of FIG. 2, and a C—N peak and an S=O peak exist.

Comparative Example 1-1

10 parts of corn starch was added into 100 parts of deionized water, and then the mixture was fully dissolved for 30 min at 80° C., and then cooled to 50° C. for later use. 6 parts of dimethyldodecylsulfopropyl ammonium salt (sinopharma chemical reagent co. Ltd) was added thereto and the mixture was sufficiently dissolved and mixed. 1 part of epoxy chloropropane was weighed and added into the starch solution, and obtained mixture reacted for 7 hours at 50° C. Then filtered, and dried at 110° C. for 2 h to obtain uniformly distributed polydisperse starch-containing microspheres. The starch-containing microspheres have a particle size concentrated distribution interval of 50-350 µm (97.5% of particle sizes are in the interval), and the particle size distribution in the particle size concentrated distribution interval has the following characteristics: (50 µm-100 µm): 10.2%; (100 µm-300 µm): 80.6%; (300 µm-350 µm): 9.2%.

Comparative Example 1-2

Starch-containing microspheres were prepared according to the method of Example 1-2, except that 0.005 part of epoxy chloropropane was not added before adding 6 parts of dimethyldodecylsulfopropyl ammonium salt, to obtain uniformly distributed polydisperse starch-containing microspheres. The starch-containing microspheres have a particle size concentrated distribution interval of 10-210 µm (92.5% of particle sizes are in the interval), and the particle size distribution in the particle size concentrated distribution interval has the following characteristics: (10 µm-60 µm): 31.8%; (60 µm-110 µm): 19.0%; (110 µm-160 µm): 18.7%; (160 µm-210 µm): 30.5%.

Comparative Example 1-3

Starch-containing microspheres were prepared according to the method of Example 1-2, except that the inorganic salt aqueous solution and 1 part of epoxy chloropropane were simultaneously added to the starch solution in one portion to obtain uniformly distributed polydisperse starch-containing microspheres. The starch-containing microspheres have a particle size concentrated distribution interval of 10-210 µm (96.8% of particle sizes are in the interval), and the particle size distribution in the particle size concentrated distribution interval has the following characteristics: (10 µm-60 µm): 7.5%; (60 µm-110 µm): 40.2%; (110 µm-160 µm): 43.5%; (160 µm-210 µm): 8.8%.

Comparative Example 1-4

Starch-containing microspheres were prepared according to the method of Example 1-2, except that no triethanolamine was added, to obtain uniformly distributed polydisperse starch-containing microspheres. The starch-containing microspheres have a particle size concentrated distribution interval of 20-200 µm (95.3% of particle sizes are in the interval), and the particle size distribution in the particle size concentrated distribution interval has the following characteristics: (20 µm-65 µm): 35.6%; (65 µm-110 µm): 21.1%; (110 µm-155 µm): 20.9%; (155 µm-200 µm): 22.4%.

Examples 2-1 to 2-8 and Comparative Examples 2-1 to 2-4 involves preparation of starch-containing microspheres containing zwitterionic monomer Example 2-1

13 parts of potato starch was added into 100 parts of deionized water, and then 10 parts of triethanolamine was added, and they were fully dissolved at 75° C. Then 0.013 part of epoxy chloropropane was added, and the mixture reacted for 2.5 h after being mixed. 7 parts of DMAPS were weighed, dissolved and mixed. 0.03 part of potassium persulfate was added thereto at 65° C. and reacted for 5 hours. 5 parts of dimethyldodecylsulfobutyl ammonium salt (sinopharma chemical reagent co. Ltd) was added and mixed well. 170 parts of solution of inorganic salt was prepared with 38 parts of NaCl, and the solution of inorganic salt and 1.5 parts of epoxy chloropropane are simultaneously dripped into the starch solution at 40° C., and the dripping at a constant speed was kept for 6 hours. The mixture continuously reacted for 2 hours after the dropwise adding was finished to obtain the uniformly distributed polydisperse starch-containing microspheres, wherein the content of the constitutional unit derived from starch is 61.8 wt %, and the content of the DMAPS constitutional unit is 34.6 wt %. The starch-containing microspheres have a particle size concentrated distribution interval of 10-170 µm (94.2% of particle sizes are in the interval), and the particle size distribution in the particle size concentrated distribution interval has the following characteristics: (10 µm-50 µm): 24.9%; (50 µm-90 µm): 25.6%; (90-130 µm): 25.1%; (130 µm-170 µm): 24.4%; and (10 µm-30 µm): 13.7%; (30 µm-50 µm): 11.3%; (50 µm-70 µm): 13.3%; (70 µm-90 µm): 12.3%; (90-110 µm): 12.1%; (110 µm-130 µm): 13.0%; (130 µm-150 µm): 12.2%; (150 µm-170 µm): 12.1%. Wherein the infrared spectrogram has a C—N peak and an S=O peak. Starch was graft polymerized with DMAPS.

Example 2-2

5 parts of potato starch are weighed and added into 100 parts of deionized water, and then 22 parts of triethanolamine are added and fully dissolved at room temperature. Then 0.04 epoxy chloropropane is added, and the mixture reacted for 2 hours after being mixed. 6 parts of MAPS are weighed and added into the starch solution, and the mixture is fully dissolved and mixed. 0.07 part of ammonium persulfate was added at 70° C. and reacted for 4 hours. 1 part of dimethylhexadecylsulfoethylammonium salt (sinopharma chemical reagent co. Ltd) was added thereto and mixed thoroughly. 33 parts of solution of inorganic salt was prepared with 0.5 part of $CaCl_2$, and the solution of inorganic salt and 7.5 parts of epoxy chloropropane are simultaneously dripped into the starch solution at 60° C., and the dripping at a constant speed was kept for 8 hours. And the mixture continuously reacted for 2 hours after the dropwise adding is finished to obtain the uniform distributed polydisperse starch-containing microspheres, wherein the content of the constitutional unit derived from starch is 26.9 wt %, and the content of the MAPS constitutional unit is 32.3 wt %. The starch-containing microspheres have a particle size concentrated distribution interval of 120-400 µm (97.1% of particle sizes are in the interval), and the particle size distribution in the particle size concentrated distribution interval has the following characteristics: (120 μm-190 μm): 26%; (190 μm-260 μm): 24.5%; (260-330 μm): 25.1%; (330 μm-400 μm): 24.4%; and (120 μm-160 μm): 14.5%; (160 μm-200 μm): 13.8%; (200 μm-240 μm): 13.3%; (240 μm-280 μm): 13.9%; (280 μm-320 μm): 14.3%; (320 μm-360 μm): 14.8%; (360 μm-400 μm): 15.4%. Wherein the infrared spectrogram has a C—N peak and an S=O peak. Starch was graft polymerized with MAPS.

Example 2-3

20 parts of cassava starch was weighed and added into 100 parts of deionized water, then 20 parts of triethanolamine was added thereto, and they were fully dissolved at 40° C. Then 0.3 part of epoxy chloropropane was added, and the mixture reacted for 1 hour after being mixed. 13 parts of DAPS were weighed into the starch solution, and thoroughly dissolved and mixed. 0.105 part of sodium persulfate was added thereto at 80° C. and reacted for 3 hours. 10 parts of dimethyloctadecyl sulfobutylammonium salt (sinopharma chemical reagent co. Ltd) was added thereto and mixed thoroughly. 150 parts of solution of inorganic salt was prepared with 16 parts of $MgCl_2$, and the solution of inorganic salt and 14 parts of epoxy chloropropane were dripped simultaneously into the starch solution at 40° C., and the dripping at a constant speed was kept for 10 hours. And they continuously reacted for 2 hours after the dropwise adding is finished to obtain the uniformly distributed polydisperse starch-containing microspheres, wherein the content of the constitutional unit derived from starch is 42.3 wt %, and the content of the DAPS constitutional unit is 27.5 wt %. The starch-containing microspheres have a particle size concentrated distribution interval of 50-300 μm (95.4% of particle sizes are in the interval), and the particle size distribution in the particle size concentrated distribution interval has the following characteristics: (50 μm-100 μm): 19.5%; (100 μm-150 μm): 18.7%; (150 μm-200 μm): 21%; (200 μm-250 μm): 20.0%; (250 μm-300 μm): 20.8%; and (50 μm-75 μm): 10.3%; (75 μm-100 μm): 9.2%; (100 μm-125 μm): 9.2%; (125-150 μm): 9.5%; (150 μm-175 μm): 10.9%; (175 μm-200 μm): 10.1%; (200 μm-225 μm): 9.5%; (225 μm-250 μm): 10.5%; (250 μm-275 μm): 10.4%; (275-300 μm): 10.4%. Wherein the infrared spectrogram has a C—N peak and an S=O peak. Starch was graft polymerized with DAPS.

Example 2-4

15 parts of mung bean starch was weighed and added into 100 parts of deionized water, then 40 parts of triethanolamine was added, and they fully dissolved at 60° C. Then 0.6 part of epoxy chloropropane was added, and the mixture reacted for 1.5 hours after being mixed. 20 parts of VPPS are weighed and added into the starch solution, and the mixture is fully dissolved and mixed. 0.2 part of potassium persulfate was added thereto at 75° C. and the mixture reacted for 5 hours. 4.5 parts of dimethyl (3-hydroxydodecyl) sulfopropyl ammonium salt (sinopharma chemical reagent co. Ltd) was added thereto and mixed thoroughly. 135 parts of solution of inorganic salt was prepared with 30 parts of $K_2SO_4$, and the solution of inorganic salt and 9.5 parts of epoxy chloropropane are simultaneously dripped into the starch solution at 30° C., and the dripping at a uniform speed was kept for 7 hours. And the mixture continuously reacted for 2 hours after the dropwise adding is finished to obtain the uniformly distributed polydisperse starch-containing microspheres, wherein the content of the constitutional unit derived from starch is 33.3 wt %, and the content of the VPPS constitutional unit is 44.3 wt %. The starch-containing microspheres have a particle size concentrated distribution interval of 150-500 μm (96.2% of particle sizes are in the interval), and the particle size distribution in the particle size concentrated distribution interval has the following characteristics: (150 μm-200 μm): 13.5%; (200 μm-250 μm): 14.2%; (250 μm-300 μm): 15.4%; (300 μm-350 μm): 14.7%; (350 μm-400 μm): 13.9%; (400 μm-450 μm): 14.7%; (450-500 μm): 13.6%. Wherein the infrared spectrogram has C—N peaks and S=O peaks. Starch was graft polymerized with VPPS.

Example 2-5

1 part of sweet potato starch was added into 100 parts of deionized water, and then 50 parts of triethanolamine was added, and fully dissolved at 50° C. Then 0.15 part of epoxy chloropropane was added, and the mixture reacted for 2.5 hours after being mixed. 0.1 part of MAPS was added into the starch solution, thoroughly dissolved and mixed. 0.001 part of ammonium persulfate was added at 65° C. and the mixture reacted for 4 hours. 0.05 part of dimethyl (6-aminotetradecyl) sulfoethylammonium salt (sinopharma chemical reagent co. Ltd) was added thereto and mixed well. 0.5 part of solution of inorganic salt was prepared with 0.025 part of NaCl, and the solution of inorganic salt and 0.1 part of epoxy chloropropane were simultaneously dripped into the starch solution at 55° C., and the dripping at a constant speed was kept for 9 hours. And the mixture continuously reacted for 2 hours after the dropwise adding was finished. Then filtered, and dried at 110° C. for 2 hours to obtain uniformly distributed polydisperse starch-containing microspheres, wherein the content of the constitutional unit derived from starch is 74.0 wt %, and the content of the MAPS constitutional unit is 7.4 wt %. The starch-containing microspheres have a particle size concentrated distribution interval of 0.1-3.7 μm (95.0% of particle sizes are in the interval), and the particle size distribution in the particle size concentrated distribution interval has the following characteristics: (0.1 μm-0.7 μm): 16.5%; (0.7 μm-1.3 μm): 15.9%; (1.3-1.9 μm): 17.2%; (1.9-2.5 μm): 17.5%; (2.5-3.1 μm): 16.4%; (3.1-3.7 μm): 16.5%; and (0.1 μm-0.5 μm): 11.9%; (0.5 μm-0.9 μm): 11.7%; (0.9-1.3 μm): 10.6%; (1.3-1.7 μm): 11.4%; (1.7-2.1 μm): 10.2%; (2.1-2.5 μm): 11.0%; (2.5-2.9 μm): 10.7%; (2.9-3.3 μm): 11.5%; (3.3 μm-3.7 μm): 11.0%. Wherein the infrared spectrogram has C—N peaks and S=O peaks. Starch was graft polymerized with MAPS.

Example 2-6

17 parts of starch (corn starch:mung bean starch=2:1 (by weight)) was weighed and added into 100 parts of deionized water, and 30 parts of triethanolamine was added and sufficiently dissolved at 72° C. Then 0.28 part of epoxy chloropropane was added, and the mixture reacted for 0.5 h after being mixed. 11.5 parts DMAPS were weighed into the starch solution and mixed well. 0.009 part of potassium persulfate was added thereto at 68° C. and reacted for 5 hours. 7 parts of dimethyldodecylsulfobutylammonium salt (sinopharma chemical reagent co. Ltd) was added thereto and mixed thoroughly. 50 parts of solution of inorganic salt was prepared with 45 parts of inorganic salt (NaCl: $CaCl_2$=1:1 by weight), and the solution of inorganic salt and 12 parts of epoxy chloropropane were simultaneously dripped into the starch solution at 57° C., wherein the dripping at a constant speed was kept for 4.5 h. After the dropwise addition, the reaction is continued for 2 hours, to obtain the uniformly distributed polydisperse starch-containing microspheres, wherein the content of the constitutional unit derived from starch is 41.6 wt %, and the content of the DMAPS constitutional unit is 28.1 wt %. The starch-containing microspheres have a particle size concentrated distribution interval of 70-270 μm (91.2% of particle sizes are in the interval), and the particle size distribution in the particle size concentrated distribution interval has the following characteristics: (70 μm-110 μm): 20.7%; (110 μm-150 μm): 20.6%; (150-190 μm): 20.1%; (190-230 μm): 19.8%; (230 μm-270 μm): 18.8%; and (70 μm-90 μm): 11.7%; (90-110 μm): 11.0%; (110 μm-130 μm): 11.3%; (130 μm-150 μm): 10.3%; (150 μm-170 μm): 11.2%; (170 μm-190 μm): 10.9%; (190 μm-210 μm): 11.4%; (210 μm-230 μm): 10.4%; (230 μm-270 μm): 11.8%. Wherein the infrared spectrogram has a C—N peak and an S=O peak. Starch was graft polymerized with DMAPS.

Example 2-7

6 parts of starch (tapioca starch:corn starch=3:1 by weight) are weighed and added into 100 parts of deionized water, and 14 parts of triethanolamine was added and fully dissolved at 65° C. Then 0.025 parts of epoxy chloropropane was added, and the mixture reacted for 1.6 hours after being mixed. 2 parts of DMAPS was added into the starch solution, and fully dissolved and mixed. 0.022 part of ammonium persulfate was added thereto at 72° C. and the mixture reacted for 4 hours. 0.8 part of dimethylhydroxyhexadecylsulfopropyl ammonium salt (sinopharma chemical reagent co. Ltd) was added thereto and mixed well. 64 parts of solution of inorganic salt was prepared with 10 parts of KNO$_3$, and the solution of inorganic salt and 7 parts of epoxy chloropropane were dripped simultaneously into the starch solution at 45° C., and the dripping at a constant speed was kept for 6 hours. And the mixture continuously reacted for 2 hours after the dropwise adding was finished. Then filtered, and dried at 110° C. for 2 hours to obtain uniform distributed polydisperse starch-containing microspheres, wherein the content of the constitutional unit derived from starch is 39.9 wt %, and the content of the DMAPS constitutional unit is 13.3 wt %. The starch-containing microspheres have a particle size concentrated distribution interval of 20-260 μm (93.7% of the particle size is in the interval), and the particle size distribution in the particle size concentrated distribution interval has the following characteristics: (20 μm-60 μm): 16.6%; (60 μm-100 μm): 17.8%; (100 μm-140 μm): 15.9%; (140 μm-180 μm): 17.5%; (180-220 μm): 17.0%; (220 μm-260 μm): 15.2%. Wherein the infrared spectrogram has a C—N peak and an S=O peak. Starch was graft polymerized with DMAPS.

Example 2-8

18 parts of wheat starch was weighed and added into 100 parts of deionized water, and then 24 parts of triethanolamine was added, and fully dissolved at 45° C. Then 0.013 part of epoxy chloropropane was added, and the mixture reacted for 2.75 h after being mixed. 3.5 parts of monomers (DMAPS:MAPS=1:1 by weight) were added into the starch solution and mixed thoroughly. 0.01 part of an initiator (sodium persulfate:potassium persulfate=1:1 by weight) was added at 67.5° C. and reacted for 6 hours. 5.5 parts of dimethyldodecylsulfopropyl ammonium salt (sinopharma chemical reagent co. Ltd) was added thereto and mixed well. 130 parts of solution of inorganic salt was prepared with 7 parts of Na$_2$CO$_3$, the solution of inorganic salt and 2 parts of epoxy chloropropane were dripped simultaneously into the starch solution at 42° C., and the dripping at a constant speed was kept for 6.5 h. And the mixture continuously reacted for 2 hours after the dropwise adding was finished, to obtain the uniform distributed polydisperse starch-containing microspheres, wherein the content of the constitutional unit derived from starch is 76.5 wt %, the content of the constitutional unit derived from DMAPS monomer is 6.2 wt %, and the content of the constitutional unit derived from MAPS monomer is 6.1 wt %. The starch-containing microspheres have a particle size concentrated distribution interval of 0.1-4.9 μm (95.6% of particle sizes are in the interval), and the particle size distribution in the particle size concentrated distribution interval has the following characteristics: (0.1 μm-0.9 μm): 16.8%; (0.9-1.7 μm): 17.6%; (1.7-2.5 μm): 16.8%; (2.5-3.3 μm): 15.9%; (3.3 μm-4.1 μm): 17.4%; (4.1-4.9 μm): 15.5%. Wherein the infrared spectrogram has a C—N peak and an S=O peak. The starch was graft polymerized with the zwitterionic monomer.

Comparative Example 2-1

13 parts of potato starch was added into 100 parts of deionized water, and they were fully dissolved at 75° C. for 30 min, and then cooled for later use. 7 parts of DMAPS were added into the starch solution and were fully dissolved and mixed. 0.03 part of potassium persulfate was added thereto at 65° C. and reacted for 5 hours. 5 parts of dimethyldodecylsulfobutylammonium salt (sinopharma chemical reagent co. Ltd) was added thereto, and sufficiently dissolved and mixed. And 1.5 parts of epoxy chloropropane was added into the starch solution, and continuously reacted for 6 hours at 40° C., to obtain the uniform distributed polydisperse starch-containing microspheres. The starch-containing microspheres have a particle size concentrated distribution interval of 120-400 μm (92.2% of particle sizes are in the interval), and the particle size distribution in the particle size concentrated distribution interval has the following characteristics: (120 μm-170 μm): 13.4%; (170 μm-350 μm): 75.4%; (350 μm-400 μm): 11.2%. Wherein the content of the constitutional unit derived from starch is 60.4 wt %, the content of the DMAPS constitutional unit is 32.5 wt %, and the starch and the DMAPS are subjected to graft polymerization.

Comparative Example 2-2

Starch-containing microspheres were prepared according to the method of Example 2-1, except that 0.013 parts of epoxy chloropropane was not added before adding 7 parts of DMAPS, to obtain uniform distributed polydisperse starch-containing microspheres. The starch-containing microspheres have a particle size concentrated distribution interval of 20-180 μm (91.8% of particle sizes are in the interval), and the particle size distribution in the particle size concentrated distribution interval has the following characteristics: (20 μm-60 μm): 32.8%; (60 μm-100 μm): 17.5%; (100 μm-140 μm): 19.2%; (140 μm-180 μm): 30.5%. Wherein the content of the constitutional unit derived from starch is 61.0 wt %, the content of the DMAPS constitutional unit is 31.9 wt %, and the starch and the DMAPS are subjected to graft polymerization.

Comparative Example 2-3

Starch-containing microspheres were prepared according to the method of Example 2-1, except that the inorganic salt aqueous solution and 1.5 parts of epoxy chloropropane were simultaneously added to the starch solution in one portion, to obtain uniform distributed polydisperse starch-containing microspheres. The starch-containing microspheres have a particle size concentrated distribution interval of 10-190 μm (96.2% of particle sizes are in the interval), and the particle size distribution in the particle size concentrated distribution interval has the following characteristics: (10 μm-55 μm): 9.9%; (55 μm-100 μm): 37.2%; (100 μm-145 μm): 42.1%; (145-190 μm): 10.8%. Wherein the content of the constitutional unit derived from starch is 60.4 wt %, the content of the DMAPS constitutional unit is 32.3 wt %, and the starch and the DMAPS are subjected to graft polymerization.

Comparative Example 2-4

Starch-containing microspheres were prepared according to the method of Example 2-1, except that no triethanolamine was added, to obtain uniform distributed polydisperse starch-containing microspheres. The starch-containing microspheres have a particle size concentrated distribution interval of 5-205 μm (94.2% of the particle size is in the interval), and the particle size distribution in the particle size concentrated distribution interval has the following characteristics: (5 μm-55 μm): 36.3%; (55 μm-105 μm): 22.1%; (105 μm-155 μm): 19.9%; (155 μm-205 μm): 21.7%. Wherein the content of the constitutional unit derived from starch is 59.6 wt %, the content of the DMAPS constitutional unit is 34.0 wt %, and the starch and the DMAPS are subjected to graft polymerization.

Examples 3-1 to 3-8 and Comparative Examples 3-1 to 3-4 are examples in which cationic monomers are added.

Example 3-1

8 parts of cassava starch was weighed and added into 100 parts of deionized water, then 17 parts of triethanolamine was added, and fully dissolved at 55° C. Then 0.009 parts of epoxy chloropropane was added and mixed, and reacted for 3 hours. 8 parts of DMDAAC was added into the starch solution, and fully dissolved and mixed. 0.1 part of sodium persulfate was added at 70° C. and reacted for 4.5 hours. 5 parts of dimethylhydroxydodecylsulfopropyl ammonium salt are added and mixed thoroughly. 90 parts of solution of inorganic salt was prepared with 62 parts of NaNO$_3$, and the solution of inorganic salt and 1 part of epoxy chloropropane were dripped simultaneously into the starch solution at 45° C., and the dripping at a constant speed was kept for 5 hours. And the mixture continuously reacted for 2 hours after the dropwise adding was finished, to obtain the uniform distributed polydisperse starch-containing microspheres, wherein the content of the constitutional unit derived from starch is 47.0 wt %, and the content of the DMDAAC constitutional unit is 47.1 wt %. The starch-containing microspheres have a particle size concentrated distribution interval of 10-170 μm (95.6% of particle sizes are in the interval), and the particle size distribution in the particle size concentrated distribution interval has the following characteristics: (10 μm-50 μm): 24.4%; (50 μm-90 μm): 25.6%; (90-130 μm): 25.1%; (130 μm-170 μm): 24.9%; and (10 μm-26 μm): 10.3%; (26 μm-42 μm): 10.9%; (42 μm-58 μm): 9.8%; (58 μm-74 μm): 9.7%; (74 μm-90 μm): 9.2%; (90-106 μm): 10.9%; (106 μm-122 μm): 9.2%; (122 μm-138 μm): 9.6%; (138 μm-154 μm): 10.4%; (154 μm-170 μm): 10.0%. Wherein the infrared spectrogram has a C—N peak and an S=O peak. The starch was graft polymerized with DMDAAC.

Example 3-2

5 parts of potato starch was weighed and added into 100 parts of deionized water, and then 15 parts of triethanolamine was added and fully dissolved at room temperature. Then 0.04 epoxy chloropropane was added, and the mixture reacted for 2 hours after being mixed. 6 parts of DEDAAC were added into the starch solution, and thoroughly dissolved and mixed. 0.04 part of ammonium persulfate was added at 70° C. and reacted for 4 hours. 1 part of dimethylhexadecylsulfoethylammonium salt was added and mixed well. 20 parts of solution of inorganic salt was prepared with 0.5 part of CaCl$_2$, and the solution of inorganic salt and 7.5 parts of epoxy chloropropane were simultaneously dripped into the starch solution at 60° C., and the dripping at a constant speed was kept for 8 hours. And the mixture continuously reacted for 2 hours after the dropwise adding was finished, to obtain the uniform distributed polydisperse starch-containing microspheres, wherein the content of the constitutional unit derived from starch is 38.3 wt %, and the content of the DEDAAC constitutional unit is 46.3 wt %. The starch-containing microspheres have a particle size concentrated distribution interval of 120-400 μm (93.7% of particle sizes are in the interval), and the particle size distribution in the particle size concentrated distribution interval has the following characteristics: (120 μm-190 μm): 24.5%; (190 μm-260 μm): 26%; (260-330 μm): 24.4%; (330 μm-400 μm): 25.1%. Wherein the infrared spectrogram has a C—N peak and an S=O peak. The starch and DEDAAC were subjected to graft polymerization.

Example 3-3

20 parts of cassava starch was weighed and added into 100 parts of deionized water, then 20 parts of triethanolamine was added, and fully dissolved at 40° C. Then 0.3 part of epoxy chloropropane was added, and the mixture reacted for 1 hour after being mixed. 10 parts of DMC was added into the starch solution, and fully dissolved and mixed. 0.105 part of sodium persulfate was added thereto at 80° C. and reacted for 3 hours. 10 parts of dimethyloctadecyl sulfobutylammonium salt were added and mixed well. 150 parts of solution of inorganic salt was prepared with 40 parts of MgCl$_2$, and the solution of inorganic salt and 14 parts of epoxy chloropropane were dripped into the starch solution at 40° C., and the dripping at a constant speed was kept for 10 hours. And the mixture continuously reacted for 2 hours after the dropwise adding was finished. Then filtered, and dried at 110° C. for 2 hours to obtain uniform distributed polydisperse starch-containing microspheres, wherein the content of the constitutional unit derived from starch is 45.2 wt %, and the content of the DMC constitutional unit is 22.5 wt %. The starch-containing microspheres have a particle size concentrated distribution interval of 50-300 μm (90.8% of particle sizes are in the interval), and the particle size distribution in the particle size concentrated distribution interval has the following characteristics: (50 μm-100 μm): 20.0%; (100 μm-150 μm): 18.7%; (150 μm-200 μm): 21%; (200 μm-250 μm): 19.5%; (250 μm-300 μm): 20.8%. Wherein the infrared spectrogram has C—N peaks and S=O peaks. The starch and DMC are graft polymerized.

Example 3-4

15 parts of mung bean starch was weighed and added into 100 parts of deionized water, then 40 parts of triethanolamine was added, and fully dissolved at 60° C. Then 0.6 part of epoxy chloropropane was added, and the mixture reacted for 1.5 hours after being mixed. 20 parts of DAC was added into the starch solution, and the mixture was fully dissolved and mixed. 0.2 part of potassium persulfate was added thereto at 75° C., and reacted for 5 hours. 8 parts of dimethyl (3-hydroxy dodecyl) sulfopropyl ammonium salt was added, and fully mixed. 120 parts of solution of inorganic salt was prepared with 30 parts of $K_2SO_4$, and the solution of inorganic salt and 8 parts of epoxy chloropropane were simultaneously dripped into the starch solution at 30° C., and the dripping at a constant speed was kept for 7 hours. And the mixture continuously reacted for 2 hours after the dropwise adding was finished. Then filtered, and dried at 110° C. for 2 hours, to obtain uniform distributed polydisperse starch-containing microspheres, wherein the content of the constitutional unit derived from starch is 38.9 wt %, and the content of the DAC constitutional unit is 51.8 wt %. The starch-containing microspheres have a particle size concentrated distribution interval of 150-500 μm (94.3% of particle sizes are in the interval), and the particle size distribution in the particle size concentrated distribution interval has the following characteristics: (150 μm-200 μm): 14.7%; (200 μm-250 μm): 13.6%; (250 μm-300 μm): 15.4%; (300 μm-350 μm): 14.7%; (350 μm-400 μm): 13.9%; (400 μm-450 μm): 13.5%; (450-500 μm): 14.2%. Wherein the infrared spectrogram has a C—N peak and an S=O peak. Starch was graft polymerized with DAC.

Example 3-5

1 part of sweet potato starch was weighed and added into 100 parts of deionized water, then 50 parts of triethanolamine was added, and they were fully dissolved at 50° C. Then 0.015 part of epoxy chloropropane was added, and the mixture reacted for 2.5 hours after being mixed. 0.1 part of DBC was added into the starch solution, and fully dissolved and mixed. 0.001 part of ammonium persulfate was added at 65° C. and reacted for 4 hours. 0.05 part of dimethyl (6-aminotetradecyl) sulfoethylammonium salt was added and mixed well. 0.5 part of solution of inorganic salt was prepared with 0.025 part of NaCl, and the solution of inorganic salt and 0.1 part of epoxy chloropropane were simultaneously dripped into the starch solution at 55° C., and the dripping at a constant speed was kept for 9 hours. And the mixture continuously reacted for 2 hours after the dropwise adding was finished, to obtain the uniform distributed polydisperse starch-containing microspheres, wherein the content of the constitutional unit derived from starch is 82.3 wt %, and the content of the DBC constitutional unit is 8.2 wt %. The starch-containing microspheres have a particle size concentrated distribution interval of 0.1-6.1 μm (96.0% of particle sizes are in the interval), and the particle size distribution in the particle size concentrated distribution interval has the following characteristics: (0.1 μm-1.1 μm): 17.5%; (1.1 μm-2.1 μm): 15.9%; (2.1 μm-3.1 μm): 17.2%; (3.1 μm-4.1 μm): 16.5%; (4.1 μm-5.1 μm): 16.4%; (5.1 μm-6.1 μm): 16.5%. Wherein the infrared spectrogram has a C—N peak and an S=O peak. The starch was graft polymerized with DBC.

Example 3-6

9 parts of starch (corn starch:mung bean starch=2:1 by weight) was weighed and added to 100 parts of deionized water, and 25 parts of triethanolamine was added, and they were sufficiently dissolved at 72° C. Then 0.35 part of epoxy chloropropane was added, and the mixture reacted for 0.5 h after being mixed. 6.5 parts of DMDAAC was added into the starch solution and thoroughly dissolved and mixed. 0.025 part of potassium persulfate was added at 68° C. and reacted for 5 hours. 3.6 parts of dimethyldodecylsulfobutylammonium salt was added and mixed well. 50 parts of solution of inorganic salt was prepared with 12 parts of inorganic salt ($NaCl:CaCl_2$=1:1 by weight), then the solution of inorganic salt and 8.5 parts of epoxy chloropropane was simultaneously dripped into the starch solution at 57° C., wherein the dripping at a constant speed was kept for 4.5 h. And the mixture continuously reacted for 2 hours after the dropwise adding was finished, to obtain the uniform distributed polydisperse starch-containing microspheres, wherein the content of the constitutional unit derived from starch is 36.9 wt %, and the content of the DMDAAC constitutional unit is 26.15 wt %. The starch-containing microspheres have a particle size concentrated distribution interval of 70-280 μm (97.1% of particle sizes are in the interval), and the particle size distribution in the particle size concentrated distribution interval has the following characteristics: (70-112 μm): 20.7%; (112 μm-154 μm): 20.6%; (154-196 μm): 20.1%; (196 μm-238 μm): 19.8%; (238 μm-280 μm): 18.8%. Wherein the infrared spectrogram has a C—N peak and an S=O peak. The starch was graft polymerized with DMDAAC.

Example 3-7

16 parts of starch (tapioca starch:corn starch=3:1 by weight) were weighed and added into 100 parts of deionized water, and then 45 parts of triethanolamine were added, and they were fully dissolved at 65° C. Then 0.025 parts of epoxy chloropropane was added, and the mixture reacted for 1.6 hours after being mixed. 6 parts of DMDAAC were weighed into the starch solution and fully dissolved and mixed. 0.016 part of ammonium sulfate was added at 72° C., and reacted for 4 h. 4.5 parts of dimethylhydroxyhexadecylsulfopropyl ammonium salt were added and mixed well. 50 parts of solution of inorganic salt was prepared with 3525 parts of $KNO_3$, and the solution of inorganic salt and 12.5 parts of epoxy chloropropane were simultaneously dripped into the starch solution at 45° C., and the dripping at a constant speed was kept for 6 hours. And the mixture continuously reacted for 2 hours after the dropwise adding was finished. Then filtered, and dried at 110° C. for 2 hours to obtain uniform distributed polydisperse starch-containing microspheres, wherein the content of the constitutional unit derived from starch is 46.3 wt %, and the content of the DMDAAC constitutional unit is 17.4 wt %. The starch-containing microspheres have a particle size concentrated distribution interval of 20-260 μm (92.8% of particle sizes are in the interval), and the particle size distribution in the particle size concentrated distribution interval has the following characteristics: (20 μm-60 μm): 17.8%; (60 μm-100 μm): 16.6%; (100 μm-140 μm): 15.9%; (140 μm-180 μm): 17.0%; (180-220 μm): 17.5%; (220 μm-260 μm): 15.2%. Wherein the infrared spectrogram has a C—N peak and an S=O peak. The starch was graft polymerized with DMDAAC.

Example 3-8

3 parts of wheat starch was weighed and added into 100 parts of deionized water, and then 22.5 parts of triethanolamine was added and fully dissolved at 45° C. Then 0.009 parts of epoxy chloropropane was added, and the mixture reacted for 2.75 hours. 2 parts of monomers (DM- DAAC:DMC=1:1 by weight) were added into the starch solution and mixed thoroughly. 0.004 parts of initiator (sodium persulfate:potassium persulfate=1:1 by weight) was added at 67.5° C. and reacted for 6 hours. 4 parts of dimethyldodecylsulfopropyl ammonium salt were added and mixed thoroughly. 160 parts of solution of inorganic salt was prepared with 5.5 parts of $Na_2CO_3$, the solution of inorganic salt and 3 parts of epoxy chloropropane were simultaneously dripped into the starch solution at 42° C., and the dripping at a constant speed was kept for 6.5 h. And the mixture continuously reacted for 2 hours after the dropwise adding was finished, to obtain the uniform distributed polydisperse starch-containing microspheres, wherein the content of the constitutional unit derived from starch is 37.6 wt %, the content of the DMDAAC constitutional unit is 6.3 wt %, and the content of the DMC constitutional unit is 6.2 wt %. The starch-containing microspheres have a particle size concentrated distribution interval of 0.1-7.3 μm (96.3% of particle sizes are in the interval), and the particle size distribution in the particle size concentrated distribution interval has the following characteristics: (0.1 μm-1.3 μm): 16.6%; (1.3-2.5 μm): 17.6%; (2.5-3.7 μm): 17.0%; (3.7-4.9 μm): 16.4%; (4.9-6.1 μm): 17.4%; (6.1-7.3 μm): 16.0%; and (0.1 μm-0.7 μm): 8.2%; (0.7 μm-1.3 μm): 8.4%; (1.3-1.9 μm): 8.6%; (1.9-2.5 μm): 9.0%; (2.5-3.1 μm): 8.5%; (3.1-3.7 μm): 8.5%; (3.7 μm-4.3 μm): 8.0%; (4.3-4.9 μm): 8.4%; (4.9-5.5 μm): 8.6%; (5.5-6.1 μm): 7.8%; (6.1-6.7 μm): 7.9%; (6.7 μm-7.3 μm): 8.1%. Wherein the infrared spectrogram has a C—N peak and an S═O peak. The starch was graft polymerized with the cationic monomer.

Comparative Example 3-1

8 parts of cassava starch was added into 100 parts of deionized water, and they were fully dissolved for 30 min at 55° C. for later use. 8 parts of DMDAAC was added into the starch solution, and fully dissolved and mixed. 0.1 part of sodium persulfate was added at 70° C. and reacted for 4.5 hours. 5 parts of dimethylhydroxydodecylsulfopropyl ammonium salt was added, and the mixture was fully dissolved and mixed. And 1 part of epoxy chloropropane was added into the starch solution, and continuously reacted for 7 hours at 45° C., to obtain the uniform distributed polydisperse starch-containing microspheres. The starch-containing microspheres have a particle size concentrated distribution interval of 120-400 μm (94.1% of particle sizes are in the interval), and the particle size distribution in the particle size concentrated distribution interval has the following characteristics: (120 μm-170 μm): 11.0%; (170 μm-350 μm): 79.8%; (350 μm-400 μm): 9.2%. Wherein the content of constitutional units derived from starch is 46.6 wt % and the content of DMDAAC constitutional units is 45.8 wt %, and the starch was graft-polymerized with DMDAAC.

Comparative Example 3-2

Starch-containing microspheres were prepared according to the method of Example 3-1, except that 0.009 parts of epoxy chloropropane was not added before adding the DMDAAC, to obtain uniform distributed polydispersed starch-containing microspheres. The starch-containing microspheres have a particle size concentrated distribution interval of 20-180 μm (95.1% of particle sizes are in the interval), and the particle size distribution in the particle size concentrated distribution interval has the following characteristics: (20 μm-60 μm): 32.7%; (60 μm-100 μm): 18.0%; (100 μm-140 μm): 19.3%; (140 μm-180 μm): 30.0%. Wherein the content of constitutional units derived from starch was found to be 46.0 wt % and the content of DMDAAC constitutional units was found to be 45.2 wt %, and the starch was graft-polymerized with DMDAAC.

Comparative Example 3-3

Starch-containing microspheres were prepared according to the method of Example 3-1, except that an inorganic salt and 1 part of epoxy chloropropane was simultaneously added to the starch solution in one portion, to obtain uniformly distributed polydisperse starch-containing microspheres. The starch-containing microspheres have a particle size concentrated distribution interval of 30-190 micrometers (92.7% of particle sizes are in the interval), and the particle size distribution in the particle size concentrated distribution interval has the following characteristics: (30 μm-70 μm): 9.9%; (70 μm-110 μm): 37.2%; (110 μm-150 μm): 42.1%; (150-190 μm): 10.8%. Wherein the content of constitutional units derived from starch was measured to be 45.2 wt %, the content of DMDAAC constitutional units was measured to be 46.1 wt %, and the starch was graft-polymerized with DMDAAC.

Comparative Example 3-4

Starch-containing microspheres were prepared according to the method of example 3-1, except that triethanolamine was not added to obtain uniformly distributed polydispersed starch-containing microspheres. The starch-containing microspheres have a particle size concentrated distribution interval of 15-215 μm (95.4% of the particle size is in the interval), and the particle size distribution in the particle size concentrated distribution interval has the following characteristics: (15 μm-65 μm): 36.3%; (65 μm-115 μm): 21.7%; (115 μm-165 μm): 19.9%; (165 μm-215 μm): 22.1%. Wherein the content of constitutional units derived from starch was 44.9 wt % and the content of DMDAAC constitutional units was 45.6 wt %, and starch was graft polymerized with DMDAAC.

Examples 4-1 to 4-8 and Comparative Examples 4-1 to 4-4 are examples in which an anionic monomer is added.

Example 4-1

11 parts of corn starch was weighed and added into 100 parts of deionized water, and then 21 parts of triethanolamine was added and they were fully dissolved at 40° C. Then 0.35 part of epoxy chloropropane was added, and the mixture reacted for 2 hours after being mixed. 6 parts of AMPS was weighed and added into the starch solution, and the mixture is fully dissolved and mixed. 0.22 part of ammonium persulfate was added at 80° C. and reacted for 6 hours. 6 parts of dimethylaminetetradecylsulfopropyl ammonium salt was added and mixed thoroughly. 130 parts of solution of inorganic salt was prepared with 62 parts of KCl, and the solution of inorganic salt and 2 parts of epoxy chloropropane were simultaneously dripped into the starch solution at 55° C., and the dripping at a constant speed was kept for 5 hours. And the mixture continuously reacted for 2 hours after the dropwise adding was finished, to obtain the uniformly distributed polydisperse starch-containing microspheres, wherein the content of the constitutional unit derived from starch is 56.9 wt %, and the content of the AMPS constitutional unit is 30.8 wt %. The starch-containing microspheres have a particle size concentrated distribution interval of 10-170 μm (92.9% of particle sizes are in the interval), and the particle size distribution in the particle size concentrated distribution interval has the following characteristics: (10 μm-50 μm): 25.4%; (50 μm-90 μm): 24.6%; (90-130 μm): 25.3%; (130 μm-170 μm): 24.7%; and (10 μm-20 μm): 6.2%; (20 μm-30 μm): 6.4%; (30 μm-40 μm): 5.9%; (40 μm-50 μm): 6.8%; (50 μm-60 μm): 6.0%; (60 μm-70 μm): 6.3%; (70-80 μm): 6.8%; (80 μm-90 μm): 5.9%; (90-100 μm): 6.5%; (100 μm-110 μm): 6.6%; (110 μm-120 μm): 5.7%; (120 μm-130 μm): 6.2%; (130 μm-140 μm): 6.5%; (140 μm-150 μm): 6.1%; (150 μm-160 μm): 6.2%; (160 μm-170 μm): 5.9%. Wherein the infrared spectrogram has a C—N peak and an S=O peak. Starch was graft polymerized with AMPS.

Example 4-2

5 parts of potato starch was weighed and added into 100 parts of deionized water, and then 16 parts of triethanolamine was added and they were fully dissolved at room temperature. Then 0.04 epoxy chloropropane was added, and the mixture reacted for 2 hours after being mixed. 6 parts of AA are weighed and added into the starch solution, and the mixture was fully dissolved and mixed. 0.12 part of ammonium persulfate was added at 70° C. and reacted for 4 hours. 1 part of dimethylhexadecylsulfoethylammonium salt was added and mixed well. 62 parts of solution of inorganic salt was prepared with 0.5 part of CaCl$_2$, and the solution of inorganic salt and 7.5 parts of epoxy chloropropane were simultaneously dripped into the starch solution at 60° C., and the dripping at a constant speed was kept for 8 hours. And the mixture continuously reacted for 2 hours after the dropwise adding was finished, to obtain the uniformly distributed polydisperse starch-containing microspheres, wherein the content of the constitutional unit derived from starch is 26.9 wt %, and the content of the AA constitutional unit is 31.8 wt %. The starch-containing microspheres have a particle size concentrated distribution interval of 120-240 μm (93.5% of particle sizes are in the interval), and the particle size distribution in the particle size concentrated distribution interval has the following characteristics: (120 μm-190 μm): 24.1%; (190 μm-260 μm): 26%; (260-330 μm): 24.8%; (330 μm-400 μm): 25.1%. Wherein the infrared spectrogram has a C—N peak and an S=O peak. Starch was graft polymerized with AA.

Examples 4-3

20 parts of cassava starch was weighed and added into 100 parts of deionized water, then 20 parts of triethanolamine was added, and they were fully dissolved at 40° C. Then 0.3 part of epoxy chloropropane was added, and the mixture reacted for 1 hour after being mixed. 5.5 parts of FA was added into the starch solution, and fully dissolved and mixed. 0.105 part of sodium persulfate was added thereto at 80° C. and reacted for 3 hours. 10 parts of dimethyloctadecyl sulfobutylammonium salt was added and mixed well. 150 parts of solution of inorganic salt was prepared with 29 parts of MgCl$_2$, and the solution of inorganic salt and 14 parts of epoxy chloropropane were simultaneously dripped into the starch solution at 40° C., and the dripping at a constant speed was kept for 10 hours. And the mixture continuously reacted for 2 hours after the dropwise adding was finished, to obtain the uniformly distributed polydisperse starch-containing microspheres, wherein the content of the constitutional unit derived from starch is 50.2 wt %, and the content of the FA constitutional unit is 13.8 wt %. The starch-containing microspheres have a particle size concentrated distribution interval of 50-300 μm (95.2% of particle sizes are in the interval), and the particle size distribution in the particle size concentrated distribution interval has the following characteristics: (50 μm-100 μm): 20.0%; (100 μm-150 μm): 18.7%; (150 μm-200 μm): 20.5%; (200 μm-250 μm): 20.0%; (250 μm-300 μm): 20.8%. Wherein the infrared spectrogram has a C—N peak and an S=O peak. The starch is graft polymerized with FA.

Example 4-4

15 parts of mung bean starch was weighed and added into 100 parts of deionized water, then 40 parts of triethanolamine was added, and they were fully dissolved at 60° C. Then 0.6 part of epoxy chloropropane was added, and the mixture reacted for 1.5 hours after being mixed. And 20 parts of SSS was added into the starch solution, and fully dissolved and mixed. 0.2 part of potassium persulfate was added thereto at 75° C. and reacted for 5 hours. 3.7 parts of dimethyl (3-hydroxy dodecyl) sulfopropyl ammonium salt was added and fully mixed. 95 parts of solution of inorganic salt was prepared with 30 parts of K$_2$SO$_4$, and the solution of inorganic salt and 5 parts of epoxy chloropropane were simultaneously dripped into the starch solution at 30° C., and the dripping at a constant speed was kept for 7 hours. And the mixture continuously reacted for 2 hours after the dropwise adding was finished, to obtain the uniformly distributed polydisperse starch-containing microspheres, wherein the content of the constitutional unit derived from starch is 36.9 wt %, and the content of the SSS constitutional unit is 50.1 wt %. The starch-containing microspheres have a particle size concentrated distribution interval of 150-500 μm (96.1% of particle sizes are in the interval), and the particle size distribution in the particle size concentrated distribution interval has the following characteristics: (150 μm-200 μm): 14.7%; (200 μm-250 μm): 13.6%; (250 μm-300 μm): 15.4%; (300 μm-350 μm): 13.9%; (350 μm-400 μm): 14.7%; (400 μm-450 μm): 14.2%; (450-500 μm): 13.5%. Wherein the infrared spectrogram has a C—N peak and an S=O peak. The starch and the SSS were graft polymerized.

Example 4-5

1 part of sweet potato starch was weighed and added into 100 parts of deionized water, then 50 parts of triethanolamine was added, and fully dissolved at 50° C. Then 0.38 part of epoxy chloropropane was added, and the mixture reacted for 2.5 hours after being mixed. 0.1 part of AOIAS was weighed and added into the starch solution, and the mixture was fully dissolved and mixed. 0.001 part of ammonium persulfate was added at 65° C. and reacted for 4 hours. 0.05 part of dimethyl (6-aminotetradecyl) sulfoethylammonium salt was added and mixed well. 0.5 part of solution of inorganic salt was prepared with 0.025 part of NaCl, and the solution of inorganic salt and 0.1 part of epoxy chloropropane were simultaneously dripped into the starch solution at 55° C., and the dripping at a constant speed was kept for 9 hours. And the mixture continuously reacted for 2 hours after the dropwise adding was finished. Then filtered, and dried at 110° C. for 2 hours, to obtain the uniformly distributed polydisperse starch-containing microspheres, wherein the content of the constitutional unit derived from starch is 63.2 wt %, and the content of the AOIAS constitutional unit is 6.2 wt %. The starch-containing microspheres have a particle size concentrated distribution interval of 0.1-6.7 μm (92.8% of particle sizes are in the interval), and the particle size distribution in the particle size concentrated distribution interval has the following characteristics: (0.1 μm-1.2 μm): 17.0%; (1.2-2.3 μm): 15.5%; (2.3-3.4 μm): 17.2%; (3.4-4.5 μm): 17.0%; (4.5-5.6 μm): 16.8%; (5.6-6.7 μm): 16.5%. Wherein the infrared spectrogram has a C—N peak and an S=O peak. The starch and AOIAS were graft polymerized.

Example 4-6

11 parts of starch (corn starch:mung bean starch=2:1 by weight) was weighed and added into 100 parts of deionized water, and 33 parts of triethanolamine was added and sufficiently dissolved at 72° C. Then 0.25 part of epoxy chloropropane was added, and the mixture reacted for 0.5 h after being mixed. 6.7 parts of AMPS was weighed and added into the starch solution, and fully dissolved and mixed. 0.014 part of potassium persulfate was added thereto at 68° C. and reacted for 5 hours. 6.8 parts of dimethyldodecylsulfobutylammonium salt was added and mixed well. 70 parts of solution of inorganic salt was prepared with 34 parts of inorganic salt (NaCl:CaCl₂=1:1 by weight), and the solution of inorganic salt and 12.5 parts of epoxy chloropropane were simultaneously dripped into the starch solution at 57° C., and the dripping at a constant speed was kept for 4.5 h. And the mixture continuously reacted for 2 hours after the dropwise adding was finished, to obtain the uniformly distributed polydisperse starch-containing microspheres, wherein the content of the constitutional unit derived from starch is 36.1 wt %, and the content of the AMPS constitutional unit is 21.9 wt %. The starch-containing microspheres have a particle size concentrated distribution interval of 70-270 μm (97.8% of particle sizes are in the interval), and the particle size distribution in the particle size concentrated distribution interval has the following characteristics: (70 μm-110 μm): 19.8%; (110 μm-150 μm): 20.6%; (150-190 μm): 20.1%; (190-230 μm): 20.7%; (230 μm-270 μm): 18.8%. Wherein the infrared spectrogram has a C—N peak and an S=O peak. Starch was graft polymerized with AMPS.

Example 4-7

18 parts of starch (tapioca starch:corn starch=3:1 by weight) are weighed and added into 100 parts of deionized water, and 12 parts of triethanolamine was added and fully dissolved at 65° C. Then 0.025 parts of epoxy chloropropane was added, and the mixture reacted for 1.6 hours after being mixed. 3.1 parts of AMPS was weighed and added into the starch solution, and was fully dissolved and mixed. 0.044 part of ammonium persulfate was added at 72° C. and reacted for 4 hours. 1.2 parts of dimethylhydroxyhexadecylsulfopropyl ammonium salt was added and mixed well. 81 parts of solution of inorganic salt was prepared with 12 parts of KNO₃, and the solution of inorganic salt and 6 parts of epoxy chloropropane were dripped simultaneously into the starch solution at 45° C., and the dripping at a constant speed was kept for 6 hours. And the mixture continuously reacted for 2 hours after the dropwise adding was finished. Then filtered, and dried at 110° C. for 2 hours to obtain uniformly distributed polydisperse starch-containing microspheres, wherein the content of the constitutional unit derived from starch is 66.3 wt %, and the content of the AMPS constitutional unit is 11.3 wt %. The starch-containing microspheres have a particle size concentrated distribution interval of 20-260 μm (94.7% of particle sizes are in the interval), and the particle size distribution in the particle size concentrated distribution interval has the following characteristics: (20 μm-60 μm): 17.3%; (60 μm-100 μm): 16.2%; (100 μm-140 μm): 16.4%; (140 μm-180 μm): 17.4%; (180 μm-220 μm): 17.4%; (220 μm-260 μm): 15.3%. Wherein the infrared spectrogram has a C—N peak and an S=O peak. Starch was graft polymerized with AMPS.

Example 4-8

2 parts of wheat starch was weighed and added into 100 parts of deionized water, then 35 parts of triethanolamine was added, and they were fully dissolved at 45° C. Then 0.014 part of epoxy chloropropane was added, and the mixture was mixed and reacted for 2.75 hours. 4.7 parts of monomers (AMPS:AA=1:1 by weight) were added into the starch solution, and thoroughly dissolved and mixed. 0.02 part of an initiator (sodium persulfate:potassium persulfate=1:1 by weight) was added at 67.5° C. and reacted for 6 hours. 7.4 parts of dimethyldodecylsulfopropyl ammonium salt was added and mixed well. 115 parts of solution of inorganic salt was prepared with 6.5 parts of Na₂CO₃, and the solution of inorganic salt and 4 parts of epoxy chloropropane were simultaneously dripped into the starch solution at 42° C., and the dripping at a constant speed was kept for 6.5 hours. And the mixture continuously reacted for 2 hours after the dropwise adding was finished, to obtain the uniformly distributed polydisperse starch-containing microspheres, wherein the content of the constitutional unit derived from starch is 18.3 wt %, and the content of the constitutional unit derived from anionic monomer is 43.6 wt %. The starch-containing microspheres have a particle size concentrated distribution interval of 0.1-8.5 μm (94.3% of particle sizes are in the interval), and the particle size distribution in the particle size concentrated distribution interval has the following characteristics: (0.1 μm-1.5 μm): 16.4%; (1.5-2.9 μm): 17.6%; (2.9-4.3 μm): 17.1%; (4.3-5.7 μm): 16.2%; (5.7 μm-7.1 μm): 17.6%; (7.1-8.5 μm): 16.1%; and (0.1 μm-0.7 μm): 7.2%; (0.7 μm-1.3 μm): 7.8%; (1.3-1.9 μm): 7.0%; (1.9 μm-2.5 μm): 7.3%; (2.5-3.1 μm): 7.4%; (3.1 μm-3.7 μm): 6.6%; (3.7 μm-4.3 μm): 7.2%; (4.3-4.9 μm): 7.0%; (4.9-5.5 μm): 7.5%; (5.5 μm-6.1 μm): 6.7%; (6.1 μm-6.7 μm): 7.5%; (6.7 μm-7.3 μm): 7.2%; (7.3 μm-7.9 μm): 7.0%; (7.9 μm-8.5 μm): 6.6%. Wherein the infrared spectrogram has a C—N peak and an S=O peak. The starch was graft polymerized with anionic monomers.

Comparative Example 4-1

11 parts of corn starch was added into 100 parts of deionized water, and fully dissolved for 30 min at 40° C. for later use. 6 parts of AMPS was weighed and added into the starch solution, and fully dissolved and mixed. 0.22 part of ammonium persulfate was added at 80° C. and reacted for 6 hours. 6 parts of dimethylaminetetradecylsulfopropyl ammonium salt was added, dissolved and mixed thoroughly. 2 parts of epoxy chloropropane was added into the starch solution, and continuously reacted for 7 hours at 55° C., to obtain a uniformly distributed polydisperse starch-containing microspheres. The starch-containing microspheres have a particle size concentrated distribution interval of 120-400 μm (95.8% of particle sizes are in the interval), and the particle size distribution in the particle size concentrated distribution interval has the following characteristics: (120 μm-170 μm): 11.6%; (170 μm-350 μm): 78.6%; (350 μm-400 μm): 9.8%. Wherein the content of the constitutional unit derived from starch is 57.6 wt %, the content of the AMPS constitutional unit is 31.2 wt %, and the starch and the AMPS were subjected to graft polymerization.

Comparative Example 4-2

Starch-containing microspheres were prepared according to the method of Example 4-1, except that no epoxy chloropropane was added before adding AMPS, to obtain uniformly distributed polydisperse starch-containing microspheres. The starch-containing microspheres have a particle size concentrated distribution interval of 20-180 μm (94.4% of particle sizes are in the interval), and the particle size distribution in the particle size concentrated distribution interval has the following characteristics: (20 μm-60 μm): 31.7%; (60 μm-100 μm): 18.1%; (100 μm-140 μm): 19.2%; (140 μm-180 μm): 31.0%. Wherein the content of the constitutional unit derived from starch is 58.0 wt %, the content of the AMPS constitutional unit is 30.7 wt %, and the starch and the AMPS are subjected to graft polymerization.

Comparative Example 4-3

Starch-containing microspheres were prepared according to the method of Example 4-1, except that an solution of inorganic salt and 2 parts of epoxy chloropropane were added to the starch solution in one portion, to obtain uniformly distributed polydisperse starch-containing microspheres. The starch-containing microspheres have a particle size concentrated distribution interval of 10-210 μm (93.9% of particle sizes are in the interval), and the particle size distribution in the particle size concentrated distribution interval has the following characteristics: (10 μm-60 μm): 9.9%; (60 μm-110 μm): 38.1%; (110 μm-160 μm): 41.2%; (160 μm-210 μm): 10.8%. Wherein the content of the constitutional unit derived from starch is 57.8 wt %, the content of the AMPS constitutional unit is 31.5 wt %, and the starch and the AMPS are subjected to graft polymerization.

Comparative Example 4-4

Starch-containing microspheres were prepared according to the method of Example 4-1, except that triethanolamine was not added, to obtain uniformly distributed polydisperse starch-containing microspheres. The starch-containing microspheres have a particle size concentrated distribution interval of 5-205 μm (92.5% of particle sizes are in the interval), and the particle size distribution in the particle size concentrated distribution interval has the following characteristics: (5 μm-55 μm): 35.2%; (55 μm-105 μm): 21.6%; (105 μm-155 μm): 20.0%; (155 μm-205 μm): 23.2%. Wherein the content of the constitutional unit derived from starch is 57.4 wt %, the content of the AMPS constitutional unit is 31.3 wt %, and the starch and the AMPS were subjected to graft polymerization.

Examples 5-1 to 5-8 and Comparative Examples 5-1 to 5-4 are examples in which a nonionic monomer is added.

Example 5-1

14 parts of wheat starch was weighed and added into 100 parts of deionized water, and then 17 parts of triethanolamine was added and fully dissolved at 72° C. Then 0.23 part of epoxy chloropropane was added, and the mixture reacted for 3 hours after being mixed. 7 parts of NVP was added into the starch solution, and fully dissolved and mixed. 0.14 part of potassium persulfate was added at 65° C. and reacted for 6 hours. 6 parts of dimethylhexadecylsulfobutylammonium salt was added and mixed well. 70 parts of solution of inorganic salt was prepared with 43 parts of NaCl, the solution of inorganic salt and 2.2 parts of epoxy chloropropane were simultaneously dripped into the starch solution at 43° C., and the dripping at a constant speed was kept for 5 hours. And the mixture continuously reacted for 2 hours after the dropwise adding was finished, to obtain the uniformly distributed polydisperse starch-containing microspheres, wherein the content of the constitutional unit derived from starch is 59.7 wt %, and the content of the NVP constitutional unit is 29.6 wt %. The starch-containing microspheres have a particle size concentrated distribution interval of 10-170 μm (93.5% of particle sizes are in the interval), and the particle size distribution in the particle size concentrated distribution interval has the following characteristics: (10 μm-50 μm): 25.3%; (50 μm-90 μm): 24.7%; (90-130 μm): 25.1%; (130 μm-170 μm): 24.9%. Wherein the infrared spectrogram has a C—N peak and an S=O peak. Starch was graft polymerized with NVP.

Example 5-2

5 parts of potato starch was weighed and added into 100 parts of deionized water, and 41 parts of triethanolamine was added and fully dissolved at room temperature. Then 0.04 epoxy chloropropane was added, and the mixture reacted for 2 hours after being mixed. 6 parts of AN was weighed and added into the starch solution, and fully dissolved and mixed. 0.019 part of ammonium persulfate was added at 70° C. and reacted for 4 hours. 1 part of dimethylhexadecylsulfoethylammonium salt was added and mixed well. 100 parts of solution of inorganic salt was prepared with 0.5 part of $CaCl_2$, and the solution of inorganic salt and 7.5 parts of epoxy chloropropane were simultaneously dripped into the starch solution at 60° C., and the dripping at a constant speed was kept for 8 hours. And the mixture continuously reacted for 2 hours after the dropwise adding was finished, to obtain the uniformly distributed polydisperse starch-containing microspheres, wherein the content of the constitutional unit derived from starch is 26.9 wt %, and the content of the AN constitutional unit is 32.8 wt %. The starch-containing microspheres have a particle size concentrated distribution interval of 50-210 μm (95.0% of particle sizes are in the interval), and the particle size distribution in the particle size concentrated distribution interval has the following characteristics: (120 μm-400 μm): 24.2%; (190 μm-260 μm): 26.1%; (260-330 μm): 24.7%; (330 μm-400 μm): 25.0%. Wherein the infrared spectrogram has a C—N peak and an S=O peak. Starch was graft polymerized with AN.

Example 5-3

20 parts of cassava starch was weighed and added into 100 parts of deionized water, then 20 parts of triethanolamine was added, and fully dissolved at 40° C. Then 0.3 part of epoxy chloropropane was added, and reacted for 1 hour after being mixed. 7 parts of NVF was weighed and added into the starch solution, and fully dissolved and mixed. 0.105 part of sodium persulfate was added thereto at 80° C. and reacted for 3 hours. 10 parts of dimethyloctadecyl sulfobutylammonium salt was added and mixed well. 150 parts of solution of inorganic salt was prepared with 3 parts of $MgCl_2$, and the solution of inorganic salt and 14 parts of epoxy chloropropane were simultaneously dripped into the starch solution at 40° C., and the dripping at a constant speed was kept for 10 hours. And the mixture continuously reacted for 2 hours after the dropwise adding was finished, to obtain a uniformly distributed polydisperse starch-containing microspheres. The content of constitutional units derived from starch was 48.4 wt %, and the content of NVF constitutional units was 16.8 wt %. The starch-containing microspheres have a particle size concentrated distribution interval of 50-300 μm (91.2% of particle sizes are in the interval), and the particle size distribution in the particle size concentrated distribution interval has the following characteristics: (50 μm-100 μm): 20.1%; (100 μm-150 μm): 18.8%; (150 μm-200 μm): 20.4%; (200 μm-250 μm): 20.1%; (250 μm-300 μm): 20.6%. Wherein the infrared spectrogram has a C—N peak and an S=O peak. Starch was graft polymerized with NVF.

Example 5-4

15 parts of mung bean starch was weighed and added into 100 parts of deionized water, then 40 parts of triethanolamine was added, and fully dissolved at 60° C. Then 0.6 part of epoxy chloropropane was added, and reacted for 1.5 hours after being mixed. 20 parts of NVA was weighed and added into the starch solution, and fully dissolved and mixed. 0.2 part of potassium persulfate was added thereto at 75° C. and reacted for 5 hours. 2.1 parts of dimethyl (3-hydroxy dodecyl) sulfopropyl ammonium salt was added and fully mixed. 84 parts of solution of inorganic salt was prepared with 30 parts of $K_2SO_4$, and the solution of inorganic salt and 2 parts of epoxy chloropropane were simultaneously dripped into the starch solution at 30° C., and the dripping at a constant speed was kept for 7 hours. And the mixture continuously reacted for 2 hours after the dropwise adding was finished. Then filtered, and dried at 110° C. for 2 hours, to obtain uniformly distributed polydisperse starch-containing microspheres, wherein the content of the constitutional unit derived from starch is 39.8 wt %, and the content of the NVA constitutional unit is 53.2 wt %. The starch-containing microspheres have a particle size concentrated distribution interval of 150-500 μm (96.2% of particle sizes are in the interval), and the particle size distribution in the particle size concentrated distribution interval has the following characteristics: (150 μm-200 μm): 14.8%; (200 μm-250 μm): 13.7%; (250 μm-300 μm): 15.2%; (300 μm-350 μm): 14.0%; (350 μm-400 μm): 14.6%; (400 μm-450 μm): 14.2%; (450-500 μm): 13.5%. Wherein the infrared spectrogram has a C—N peak and an S=O peak. The starch was graft polymerized with NVA.

Example 5-5

1 part of sweet potato starch was weighed and added into 100 parts of deionized water, then 50 parts of triethanolamine was added, and fully dissolving at 50° C. Then 0.51 part of epoxy chloropropane was added, and reacted for 2.5 h after being mixed. 0.1 part of AN is weighed and added into the starch solution, and fully dissolved and mixed. 0.001 part of ammonium persulfate was added at 65° C. and reacted for 4 hours. 0.05 part of dimethyl (6-aminotetradecyl) sulfoethyl ammonium salt was added and mixed well. 0.5 part of solution of inorganic salt was prepared with 0.025 part of NaCl, and the solution of inorganic salt and 0.1 part of epoxy chloropropane were simultaneously dripped into the starch solution at 55° C., and the dripping at a constant speed was kept for 9 hours. And the mixture continuously reacted for 2 hours after the dropwise adding was finished. Then filtered, and dried for 2 hours at 110° C., to obtain the uniformly distributed polydisperse starch-containing microspheres. The content of constitutional units derived from starch was 58.4 wt % and the content of AN constitutional units was 5.8 wt %. The starch-containing microspheres have a particle size concentrated distribution interval of 0.1-7.9 μm (93.8% of particle sizes are in the interval), and the particle size distribution in the particle size concentrated distribution interval has the following characteristics: (0.1 μm-1.4 μm): 17.1%; (1.4-2.7 μm): 16.0%; (2.7 μm-4.0 μm): 17.0%; (4.0 μm-5.3 μm): 17.1%; (5.3 μm-6.6 μm): 16.8%; (6.6 μm-7.9 μm): 16.0%. Wherein the infrared spectrogram has a C—N peak and an S=O peak. Starch was graft polymerized with AN.

Example 5-6

3 parts of starch (corn starch:mung bean starch=2:1 by weight) was weighed into 100 parts of deionized water, and 23 parts of triethanolamine was added and sufficiently dissolved at 72° C. Then 0.06 part of epoxy chloropropane was added, and reacted for 0.5 h after being mixed. 10 parts of NVP was added into the starch solution, and fully dissolved and mixed. 0.01 part of potassium persulfate was added thereto at 68° C. and reacted for 5 hours. 4.1 parts of dimethyldodecylsulfobutylammonium salt was added and mixed well. 50 parts of solution of inorganic salt was prepared with 38 parts of inorganic salt ($NaCl:CaCl_2$=1:1 by weight), and the solution of inorganic salt and 13 parts of epoxy chloropropane were simultaneously dripped into the starch solution at 57° C., and the dripping at a constant speed was kept for 4.5 h. And the mixture continuously reacted for 2 hours after the dropwise adding was finished, to obtain a uniformly distributed polydisperse starch-containing microspheres. The content of constitutional units derived from starch was 11.5 wt %, and the content of NVP constitutional units was 37.5 wt %. The starch-containing microspheres have a particle size concentrated distribution interval of 70-320 μm (97.5% of particle sizes are in the interval), and the particle size distribution in the particle size concentrated distribution interval has the following characteristics: (70 μm-120 μm): 19.7%; (120 μm-170 μm): 20.5%; (170 μm-220 μm): 20.1%; (220 μm-270 μm): 20.5%; (270 μm-320 μm): 19.2%. Wherein the infrared spectrogram has a C—N peak and an S=O peak. Starch was graft polymerized with NVP.

Example 5-7

12 parts of starch (tapioca starch:corn starch=3:1 by weight) are weighed and added into 100 parts of deionized water, and then 16 parts of triethanolamine was added and fully dissolved at 65° C. Then 0.025 parts of epoxy chloropropane was added, and reacted for 1.6 hours after being mixed. 3.6 parts of NVP was weighed and added into the starch solution, and fully dissolved and mixed. 0.066 part of ammonium persulfate was added at 72° C. and reacted for 4 hours. 2 parts of dimethylhydroxyhexadecylsulfopropyl ammonium salt was added and mixed thoroughly. 57 parts of solution of inorganic salt was prepared with 12 parts of $KNO_3$, and the solution of inorganic salt and 3.4 parts of epoxy chloropropane were simultaneously dripped into the starch solution at 45° C., and the dripping at a constant speed was kept for 6 h. And the mixture continuously reacted for 2 hours after the dropwise adding was finished, to obtain a uniformly distributed polydisperse starch-containing microspheres. The content of constitutional units derived from starch was 62.9 wt %, and the content of NVP constitutional units was 18.8 wt %. The starch-containing microspheres have a particle size concentrated distribution interval of 20-260 μm (92.5% of particle sizes are in the interval), and the particle size distribution in the particle size concentrated distribution interval has the following characteristics: (20 μm-60 μm): 17.0%; (60 μm-100 μm): 16.3%; (100 μm-140 μm): 16.7%; (140 μm-180 μm): 17.3%; (180-220 μm): 17.4%; (220 μm-260 μm): 15.3%. Wherein the infrared spectrogram has a C—N peak and an S═O peak. Starch was graft polymerized with NVP.

Example 5-8

19 parts of wheat starch was weighed and added into 100 parts of deionized water, and 27 parts of triethanolamine was added and fully dissolved at 45° C. Then 0.013 part of epoxy chloropropane was added, and reacted for 2.75 h after being mixed. 5.2 parts of monomers (NVP:NVF=1:1 by weight) were added into the starch solution and thoroughly dissolved and mixed. 0.017 part of initiator (sodium persulfate:potassium persulfate=1:1 by weight) was added at 67.5° C. and reacted for 6 hours. 8 parts of dimethyldodecylsulfopropyl ammonium salt was added and mixed thoroughly. 108 parts of solution of inorganic salt was prepared with 9 parts of $Na_2CO_3$, the solution of inorganic salt and 5 parts of epoxy chloropropane were simultaneously dripped into the starch solution at 42° C., and the dripping at a constant speed was kept for 6.5 h. And the mixture continuously reacted for 2 hours after the dropwise adding was finished, to obtain the uniformly distributed polydisperse starch-containing microspheres. The content of constitutional units derived from starch was 64.9% by weight and the content of constitutional units derived from nonionic monomer was 17.7% by weight. The starch-containing microspheres have a particle size concentrated distribution interval of 0.1-10.3 μm (93.3% of the particle size is in the interval), and the particle size distribution in the particle size concentrated distribution interval has the following characteristics: (0.1 μm-1.8 μm): 16.0%; (1.8-3.5 μm): 17.5%; (3.5 μm-5.2 μm): 17.3%; (5.2-6.9 μm): 16.6%; (6.9-8.6 μm): 17.5%; (8.6-10.3 μm): 16.1%. Wherein the infrared spectrogram has a C—N peak and an S═O peak. The starch and the nonionic monomer were subjected to graft polymerization.

Comparative Example 5-1

14 parts of wheat starch was added into 100 parts of deionized water, fully dissolved for 30 min at 72° C., and then cooled for later use. 7 parts of NVP was weighed and added into the starch solution, and fully dissolved and mixed. 0.14 part of potassium persulfate was added at 65° C. and reacted for 6 hours. 6 parts of dimethylhexadecylsulfobutylammonium salt was added, and sufficiently dissolved and mixed. 2.2 parts of epoxy chloropropane was weighed and added into the starch solution, and continuously reacted for 7 hours at 43° C., to obtain a uniformly distributed polydisperse starch-containing microspheres. Wherein the content of the constitutional unit derived from starch is 60.3 wt %, and the content of the NVP constitutional unit is 27.9 wt %. The starch-containing microspheres have a particle size concentrated distribution interval of 120-400 μm (94.5% of particle sizes are in the interval), and the particle size distribution in the particle size concentrated distribution interval has the following characteristics: (120 μm-170 μm): 12.8%; (170 μm-350 μm): 78.3%; (350 μm-400 μm): 8.9%. Starch was graft polymerized with NVP.

Comparative Example 5-2

Starch-containing microspheres were prepared according to the method of Example 5-1, except that 0.23 part of epoxy chloropropane was not added before adding NVP, to obtain uniformly distributed polydisperse starch-containing microspheres. The starch-containing microspheres have a particle size concentrated distribution interval of 20-180 μm (92.5% of particle sizes are in the interval), and the particle size distribution in the particle size concentrated distribution interval has the following characteristics: (20 μm-60 μm): 31.5%; (60 μm-100 μm): 18.0%; (100 μm-140 μm): 19.3%; (140 μm-180 μm): 31.2%. Wherein the content of the constitutional unit derived from starch is 58.8 wt %, the content of the NVP constitutional unit is 29.0 wt %, and the starch and the NVP were subjected to graft polymerization.

Comparative Example 5-3

Starch-containing microspheres were prepared according to the method of Example 5-1, except that the solution of inorganic salt and 2.2 parts of epoxy chloropropane were simultaneously added to the starch solution in one portion, to obtain a uniformly distributed polydisperse starch-containing microspheres. The starch-containing microspheres have a particle size concentrated distribution interval of 30-230 μm (91.8% of particle sizes are in the interval), and the particle size distribution in the particle size concentrated distribution interval has the following characteristics: (30 μm-80 μm): 9.8%; (80 μm-130 μm): 38.2%; (130 μm-180 μm): 41.1%; (180-230 μm): 10.9%. Wherein the content of the constitutional unit derived from starch is 59.1 wt %, the content of the NVP constitutional unit is 29.4 wt %, and the starch and the NVP were subjected to graft polymerization.

Comparative Example 5-4

Starch-containing microspheres were prepared according to the method of Example 5-1, except that triethanolamine was not added, to obtain a uniformly distributed polydisperse starch-containing microspheres. The starch-containing microspheres have a particle size concentrated distribution interval of 20-200 μm (93.2% of the particle sizes are in the interval), and the particle size distribution in the particle size concentrated distribution interval has the following characteristics: (20 μm-65 μm): 35.0%; (65 μm-110 μm): 21.8%; (110 μm-155 μm): 19.8%; (155 μm-200 μm): 23.4%. Wherein the content of the constitutional unit derived from starch is 58.6 wt %, the content of the NVP constitutional unit is 28.7 wt %, and the starch and the NVP were subjected to graft polymerization.

Examples 6-1 to 6-10 and Comparative Examples 6-1 to 6-4 are examples in which two or more monomers are added.

Example 6-1

10 parts of sweet potato starch was weighed and added into 100 parts of deionized water, then 25 parts of triethanolamine was added, and fully dissolved at 80° C. Then 0.05 part of epoxy chloropropane was added, and reacted for 3 hours after being mixed. 8 parts of monomers (MAPS:NVF:AA=1:1:1 by weight) was weighed and added into the starch solution and thoroughly dissolved and mixed. 0.15 part of sodium persulfate was added thereto at 62° C. and reacted for 6 hours. 4 parts of dimethylhydroxytetradecylsulfopropyl ammonium salt are added and mixed thoroughly. 150 parts of solution of inorganic salt was prepared with 50 parts of NaCl, the solution of inorganic salt and 3 parts of epoxy chloropropane were simultaneously dripped into the starch solution at 44° C., and the dripping at a constant speed was kept for 5 hours. And the mixture continuously reacted for 2 hours after the dropwise adding was finished, to obtain a uniformly distributed polydisperse starch-containing microspheres. The starch-containing microspheres have a particle size concentrated distribution interval of 10-170 μm (94.5% of particle sizes are in the interval), and the particle size distribution in the particle size concentrated distribution interval has the following characteristics: (10 μm-50 μm): 25.4%; (50 μm-90 μm): 25.1%; (90-130 μm): 25.1%; (130 μm-170 μm): 24.4%; and (10 μm-30 μm): 11.3%; (30 μm-50 μm): 13.2%; (50 μm-70 μm): 12.8%; (70 μm-90 μm): 12.2%; (90-110 μm): 13.5%; (110 μm-130 μm): 11.6%; (130 μm-150 μm): 12.2%; (150 μm-170 μm): 13.2%. Wherein the infrared spectrogram has a C—N peak and an S=O peak. The content of the constitutional unit derived from starch is 47.5 wt %, the content of the constitutional unit derived from functional monomer is 37.9 wt %, wherein the content of the MAPS constitutional unit is 11.8 wt %, the content of the NVF constitutional unit is 12.5 wt %, and the content of the AA constitutional unit is 13.6 wt %. Starch was graft polymerized with MAPS, NVF and AA.

Example 6-2

5 parts of potato starch was weighed and added into 100 parts of deionized water, and then 33 parts of triethanolamine was added and fully dissolved at room temperature. Then 0.04 epoxy chloropropane was added, and reacted for 2 hours after being mixed. 6 parts of monomers (DMC:SSS=1:2 by weight) were weighed and added into the starch solution and mixed thoroughly. 0.17 part of ammonium persulfate was added at 70° C. and reacted for 4 hours. 1 part of dimethylhexadecylsulfoethyl ammonium salt was added and mixed well. 120 parts of solution of inorganic salt was prepared with 0.5 part of $CaCl_2$, and the solution of inorganic salt and 7.5 parts of epoxy chloropropane were simultaneously dripped into the starch solution at 60° C., and the dripping at a constant speed was kept for 8 hours. And the mixture continuously reacted for 2 hours after the dropwise adding was finished, to obtain a uniformly distributed polydisperse starch-containing microspheres. The starch-containing microspheres have a particle size concentrated distribution interval of 120-400 μm (95.4% of particle sizes are in the interval), and the particle size distribution in the particle size concentrated distribution interval has the following characteristics: (120 μm-190 μm): 25.8%; (190 μm-260 μm): 24.5%; (260-330 μm): 25.3%; (330 μm-400 μm): 24.4%. Wherein the infrared spectrogram has a C—N peak and an S=O peak. The content of constitutional units derived from starch was 26.9 wt %, the content of DMC constitutional units was 10.7 wt %, the content of SSS constitutional units was 20.12 wt %, and starch was graft-polymerized with DMC and SSS.

Example 6-3

20 parts of cassava starch was weighed and added into 100 parts of deionized water, then 20 parts of triethanolamine was added, and fully dissolved at 40° C. Then 0.3 part of epoxy chloropropane was added, and reacted for 1 hour after being mixed. 17 parts of monomers (FA:NVA=3:1 by weight) were weighed and added into the starch solution and mixed thoroughly. 0.105 part of sodium persulfate was added thereto at 80° C. and reacted for 3 hours. 10 parts of dimethyloctadecyl sulfobutyl ammonium salt was added and mixed well. 150 parts of solution of inorganic salt was prepared with 26 parts of $MgCl_2$, and the solution of inorganic salt and 14 parts of epoxy chloropropane were dripped simultaneously into the starch solution at 40° C., and the dripping at a constant speed was kept for 10 hours. And the mixture continuously reacted for 2 hours after the dropwise adding was finished. Then filtered, and dried for 2 hours at 110° C. to obtain a uniformly distributed polydisperse starch-containing microspheres. The starch-containing microspheres have a particle size concentrated distribution interval of 50-300 μm (95.2% of particle sizes are in the interval), and the particle size distribution in the particle size concentrated distribution interval has the following characteristics: (50 μm-100 μm): 19.5%; (100 μm-150 μm): 18.7%; (150 μm-200 μm): 21%; (200 μm-250 μm): 20.0%; (50 μm-100 μm): 20.8%. Wherein the infrared spectrogram has a C—N peak and an S=O peak. The content of constitutional units derived from starch was 38.9 wt %, the content of constitutional units derived from functional monomer was 33.1 wt %, wherein the content of FA constitutional units was 24.2 wt %, and the content of NVA constitutional units was 8.2 wt %. The starch was grafted and polymerized with FA and NVA.

Example 6-4

15 parts of mung bean starch was weighed and added into 100 parts of deionized water, then 40 parts of triethanolamine was added, and fully dissolved at 60° C. Then 0.6 part of epoxy chloropropane was added, and reacted for 1.5 hours after being mixed. 20 parts of monomers (DAPS:DBC:AMPS:NVP=2:1:2:1 by weight) were weighed and added into the starch solution and thoroughly dissolved and mixed. 0.2 part of potassium persulfate was added thereto at 75° C. and reacted for 5 hours. 7.3 parts of dimethyl (3-hydroxy dodecyl) sulfopropyl ammonium salt was added, and fully mixed. 135 parts of solution of inorganic salt was prepared with 19 parts of $K_2SO_4$, the solution of inorganic salt and 11 parts of epoxy chloropropane were simultaneously dripped into the starch solution at 30° C., and the dripping at a constant speed was kept for 7 hours. And the mixture continuously reacted for 2 hours after the dropwise adding was finished, to obtain a uniformly distributed polydisperse starch-containing microspheres. The starch-containing microspheres have a particle size concentrated distribution interval of 150-500 μm (96.2% of particle sizes are in the interval), and the particle size distribution in the particle size concentrated distribution interval has the following characteristics: (150 μm-200 μm): 13.5%; (200 μm-250 μm): 14.1%; (250 μm-300 μm): 15.4%; (300 μm-350 μm): 14.8%; (350 μm-400 μm): 14.0%; (400 μm-450 μm): 14.7%; (450-500 μm): 13.5%. Wherein the infrared spectrogram has a C—N peak and an S=O peak. The content of constitutional units derived from starch is 32.1 wt %, the content of constitutional units derived from functional monomer is 42.9 wt %, and the content of DAPS, DBC, AMPS and NVP constitutional units is 15.2 wt %, 8.6 wt %, 15.0 wt % and 7.8 wt % respectively. Starch was graft polymerized with DAPS, DBC, AMPS and NVP.

Example 6-5

1 part of sweet potato starch was weighed and added into 100 parts of deionized water, then 50 parts of triethanolamine was added and fully dissolved at 50° C. Then 0.19 part of epoxy chloropropane was added, and reacted for 2.5 hours after being mixed. 0.1 parts of monomers (MABS: DMDAAC:AA:AN=1:1:1:1 by weight) were weighed and added into the starch solution and thoroughly dissolved and mixed. 0.001 part of ammonium persulfate was added at 65° C. and reacted for 4 hours. 0.05 part of dimethyl (6-aminotetradecyl) sulfoethyl ammonium salt was added and mixed well. 0.5 part of solution of inorganic salt was prepared with 0.025 part of NaCl, and the solution of inorganic salt and 0.1 part of epoxy chloropropane were simultaneously dripped into the starch solution at 55° C., and the dripping at a constant speed was kept for 9 hours. And the mixture continuously reacted for 2 hours after the dropwise adding was finished, to obtain a uniformly distributed polydisperse starch-containing microspheres. The starch-containing microspheres have a particle size concentrated distribution interval of 0.2-6.2 μm (92.7% of particle sizes are in the interval), and the particle size distribution in the particle size concentrated distribution interval has the following characteristics: (0.2 μm-1.2 μm): 16.5%; (1.2-2.2 μm): 15.9%; (2.2 μm-3.2 μm): 17.2%; (3.2-4.2 μm): 17.5%; (4.2-5.2 μm): 16.4%; (5.2-6.2 μm): 16.5%. Wherein the infrared spectrogram has a C—N peak and an S=O peak. The content of constitutional units derived from starch is 71.9 wt %, the content of constitutional units derived from functional monomer is 7.2 wt %, and the content of MABS, DMDAAC, AA and AN constitutional units is 1.7 wt %, 1.9 wt %, 1.6 wt % and 2.0 wt % respectively. Starch was graft polymerized with MABS, DMDAAC, AA, and AN.

Example 6-6

7 parts of starch (corn starch:mung bean starch=2:1 by weight) was weighed into 100 parts of deionized water, then 32 parts of triethanolamine was added, and fully dissolved at 72° C. Then 0.08 part of epoxy chloropropane was added, and reacted for 0.5 h after being mixed. 2 parts of monomers (VPPS:DAC:AOIAS:NVA=1:1:4:1 by weight) were weighed and added into the starch solution and thoroughly dissolved and mixed. 0.09 part of potassium persulfate was added thereto at 68° C. and reacted for 5 hours. 3.1 parts of dimethyldodecyl sulfobutyl ammonium salt were added and mixed well. 76 parts of solution of inorganic salt was prepared with 45 parts of inorganic salt (NaCl:CaCl$_2$=1:1 by weight), and the solution of inorganic salt and 4.9 parts of epoxy chloropropane were simultaneously dripped into the starch solution at 57° C., and the dripping at a constant speed was kept for 4.5 hours. And the mixture continuously reacted for 2 hours after the dropwise adding was finished, to obtain a uniformly distributed polydisperse starch-containing microspheres. The starch-containing microspheres have a particle size concentrated distribution interval of 70-290 μm (92.1% of particle sizes are in the interval), and the particle size distribution in the particle size concentrated distribution interval has the following characteristics: (70 μm-114 μm): 20.5%; (114 μm-158 μm): 20.8%; (158 μm-202 μm): 20.0%; (202 μm-246 μm): 19.9%; (246 μm-290 μm): 18.8%. Wherein the infrared spectrogram has a C—N peak and an S=O peak. The content of constitutional units derived from starch is 49.8 wt %, the content of constitutional units derived from functional monomer is 14.3 wt %, and the content of VPPS, DAC, AOIAS and NVA constitutional units is 2.1 wt %, 2.3 wt %, 7.1 wt % and 2.8 wt % respectively. Starch was graft polymerized with VPPS, DAC, AOIAS and NVA.

Example 6-7

3 parts of starch (tapioca starch:corn starch=3:1 by weight) was weighed and added into 100 parts of deionized water, and then 23 parts of triethanolamine was added and fully dissolved at 65° C. Then 0.025 parts of epoxy chloropropane was added, and reacted for 1.6 hours after being mixed. 2.6 parts of monomers (MAPS:DMC:FA:NVP=3:1:1:2 by weight) were weighed and added into the starch solution and thoroughly dissolved and mixed. 0.13 part of ammonium persulfate was added at 72° C. and reacted for 4 hours. 2 parts of dimethylhydroxyhexadecyl sulfopropyl ammonium salt was added and mixed thoroughly. 87 parts of solution of inorganic salt was prepared with 11 parts of KNO$_3$, and the solution of inorganic salt and 6.2 parts of epoxy chloropropane were simultaneously dripped into the starch solution at 45° C., wherein the dripping at a constant speed was kept for 6 h. And the mixture continuously reacted for 2 hours after the dropwise adding was finished, to obtain a uniformly distributed polydisperse starch-containing microspheres. The starch-containing microspheres have a particle size concentrated distribution interval of 20-260 μm (95.7% of particle sizes are in the interval), and the particle size distribution in the particle size concentrated distribution interval has the following characteristics: 15.2%; (60 μm-100 μm): 15.9%; (100 μm-140 μm): 17.8%; (140 μm-180 μm): 17.5%; (180-220 μm): 17.0%; (220 μm-260 μm): 16.6%. Wherein the infrared spectrogram has a C—N peak and an S=O peak. The content of the constitutional unit derived from starch is 25.2 wt %, the content of the constitutional unit derived from functional monomer is 21.7 wt %, and the content of MAPS, DMC, FA and NVP constitutional units is 9.4 wt %, 3.3 wt %, 2.9 wt % and 6.1 wt % respectively. Starch was graft polymerized with MAPS, DMC, FA, and NVP.

Example 6-8

5 parts of wheat starch was weighed and added into 100 parts of deionized water, and then 36 parts of triethanolamine was added and fully dissolved at 45° C. Then 0.34 part of epoxy chloropropane was added, and reacted for 2.75 h after being mixed. 4 parts of monomers (AN:NVP=1:1 by weight) are weighed and added into the starch solution and mixed thoroughly. 0.012 parts of initiator (sodium persulfate:potassium persulfate=1:1 by weight) was added at 67.5° C. and reacted for 6 h. 8 parts of dimethyldodecylsulfopropyl ammonium salt was added and mixed thoroughly. 66 parts of solution of inorganic salt was prepared with 8 parts of Na$_2$CO$_3$, and the solution of inorganic salt and 9 parts of epoxy chloropropane were dripped simultaneously into the starch solution at 42° C., and the dripping at a constant speed was kept for 6.5 hours. And the mixture continuously reacted for 2 hours after the dropwise adding was finished, to obtain a uniformly distributed polydisperse starch-containing microspheres. The starch-containing microspheres have a particle size concentrated distribution interval of 0.1-12.1 μm (94.5% of particle sizes are in the interval), and the particle size distribution in the particle size concentrated distribution interval has the following characteristics: (0.1 μm-2.1 μm): 16.6%; (2.1-4.1 μm): 17.4%; (4.1-6.1 μm): 16.8%; (6.1-8.1 μm): 16.3%; (8.1-10.1 μm): 17.4%; (10.1-12.1 μm): 15.5%. Wherein the infrared spectrogram has a C—N peak and an S=O peak. The content of a constitutional unit derived from starch is 27.0 wt %, the content of a constitutional unit derived from functional monomer is 21.8 wt %, and the content of AN, NVP constitutional units is 11.1 wt %, 10.7 wt % respectively. Starch was graft polymerized with MAPS, AN and NVP.

Example 6-9

7 parts of wheat starch was weighed and added into 100 parts of deionized water, then 18 parts of triethanolamine was added, and fully dissolved at 55° C. Then 0.16 part of epoxy chloropropane was added, and reacted for 3 hours after being mixed. 8 parts of monomers (MAPS:DEDAAC:AMPS:AN=1:1:1:1 by weight) were weighed into the starch solution, and fully dissolved and mixed. 0.1 part of initiator (sodium persulfate) was added at 68° C. and reacted for 6.5 h. 9 parts of dimethyltetradecylsulfopropyl ammonium salt was added and mixed well. 70 parts of solution of inorganic salt was prepared with 10 parts of $K_2CO_3$, and the solution of inorganic salt and 3 parts of epoxy chloropropane were simultaneously dripped into the starch solution at 44° C., and the dripping at a constant speed was kept for 8 hours. And the mixture continuously reacted for 2 hours after the dropwise adding was finished. Then filtered, and dried for 2 hours at 110° C., to obtain a uniformly distributed polydisperse starch-containing microspheres. The starch-containing microspheres have a particle size concentrated distribution interval of 120-380 μm (90.5% of the particle size is in the interval), and the particle size distribution in the particle size concentrated distribution interval has the following characteristics: (120 μm-185 μm): 25.6%; (185 μm-250 μm): 24.8%; (250 μm-315 μm): 25.3%; (315 μm-380 μm): 24.3%. Wherein the infrared spectrogram has a C—N peak and an S=O peak. The content of the constitutional unit derived from starch is 38.5 wt %, the content of the constitutional unit derived from functional monomer is 43.2 wt %, and the content of the MAPS, DEDAAC, AMPS and AN constitutional units is 10.7 wt %, 10.9 wt %, 11.7 wt % and 9.9 wt % respectively. Starch was graft polymerized with MAPS, DEDAAC, AMPS and AN.

Example 6-10

15 parts of corn starch was weighed and added into 100 parts of deionized water, then 44 parts of triethanolamine was added, and fully dissolved at 65° C. Then 0.02 part of epoxy chloropropane was added, and reacted for 3 hours after being mixed. 7 parts of monomers (DMAPS:AMPS:NVF=1:2:3 by weight) were weighed and added into the starch solution and thoroughly dissolved and mixed. 0.012 parts of initiator (ammonium persulfate:potassium persulfate=1:2 by weight) was added at 73° C. and reacted for 4 hours. 4 parts of dimethyldodecylsulfopropyl ammonium salt was added and mixed thoroughly. 110 parts of solution of inorganic salt was prepared with 25 parts of NaCl, and the solution of inorganic salt and 7 parts of epoxy chloropropane were simultaneously dripped into the starch solution at 40° C., and the dripping at a constant speed was kept for 7 hours. And the mixture continuously reacted for 2 hours after the dropwise adding was finished, to obtain a uniformly distributed polydisperse starch-containing microspheres. The starch-containing microspheres have a particle size concentrated distribution interval of 40-280 μm (93.6% of the particle sizes are in the interval), and the particle size distribution in the particle size concentrated distribution interval has the following characteristics: (40 μm-88 μm): 20.8%; (88 μm-136 μm): 20.8%; (136-184 μm): 20.0%; (184 μm-232 μm): 19.6%; (232 μm-280 μm): 18.8%. Wherein the infrared spectrogram has a C—N peak and an S=O peak. The content of the constitutional unit derived from starch is 51.6 wt %, the content of the constitutional unit derived from functional monomer is 24.2 wt %, and the content of the DMAPS, MAPS and NVF constitutional units is 4.1 wt %, 8.2 wt % and 11.9 wt % respectively. Starch was graft polymerized with DMAPS, MAPS and NVF.

Example 6-11

Starch-containing microspheres were prepared according to the method of Example 6-1, except that triethanolamine was replaced by trimethanolamine with the same amount, to obtain a uniformly distributed polydisperse starch-containing microspheres. The starch-containing microspheres have a particle size concentrated distribution interval of 10-170 μm (94.5% of particle sizes are in the interval), and the particle size distribution in the particle size concentrated distribution interval has the following characteristics: (10 μm-50 μm): 25.4%; (50 μm-90 μm): 25.1%; (90-130 μm): 25.1%; (130 μm-170 μm): 24.4%; and (10 μm-30 μm): 11.3%; (30 μm-50 μm): 13.7%; (50 μm-70 μm): 13.7%; (70 μm-90 μm): 11.8%; (90-110 μm): 13.5%; (110 μm-130 μm): 11.6%; (130 μm-150 μm): 12.2%; (150 μm-170 μm): 12.2%. Wherein the infrared spectrogram has a C—N peak and an S=O peak. The content of the constitutional unit derived from starch is 47.2 wt %, the content of the constitutional unit derived from functional monomer is 37.0 wt %, the content of the MAPS constitutional unit is 11.7 wt %, the content of the NVF constitutional unit is 12.1 wt %, and the content of the AA constitutional unit is 13.2 wt %, and the starch was graft-polymerized with MAPS, NVF, and AA.

Example 6-12

Starch-containing microspheres were prepared according to the method of Example 6-1, except that epoxy chloropropane was replaced by phosphorus oxychloride with the same amount, to obtain a uniformly distributed polydisperse starch-containing microspheres. The starch-containing microspheres have a particle size concentrated distribution interval of 10-170 μm (94.5% of particle sizes are in the interval), and the particle size distribution in the particle size concentrated distribution interval has the following characteristics: (10 μm-50 μm): 25.4%; (50 μm-90 μm): 25.1%; (90-130 μm): 25.1%; (130 μm-170 μm): 24.4%; and (10 μm-30 μm): 13.2%; (30 μm-50 μm): 13.3%; (50 μm-70 μm): 12.9%; (70 μm-90 μm): 11.5%; (90-110 μm): 13.1%; (110 μm-130 μm): 11.6%; (130 μm-150 μm): 12.4%; (150 μm-170 μm): 12.0%. Wherein the infrared spectrogram has a C—N peak and an S=O peak. The content of the constitutional unit derived from starch is 47.2 wt %, the content of the constitutional unit derived from functional monomer is 37.9 wt %, the content of the MAPS constitutional unit is 11.7 wt %, the content of the NVF constitutional unit is 13.5 wt %, the content of the AA constitutional unit is 12.7 wt %, the starch was graft polymerized with MAPS, NVF and AA.

Comparative Example 6-1

10 parts of sweet potato starch was added into 100 parts of deionized water, fully dissolved for 30 min at 80° C., and then cooled for later use. 8 parts of monomers (MAPS:NVF:AA=1:1:1 by weight) were weighed and added into the starch solution and thoroughly dissolved and mixed. 0.15 part of sodium persulfate was added thereto at 62° C. and reacted for 6 hours. 4 parts of dimethylhydroxytetradecylsulfopropyl ammonium salt was added, and dissolved and mixed. 3 parts of epoxy chloropropane was weighed and added into the starch solution, and continuously reacted for 7 hours at 44° C., to obtain a uniformly distributed polydisperse starch-containing microspheres. The starch-containing microspheres have a particle size concentrated distribution interval of 120-400 μm (95.9% of particle sizes are in the interval), and the particle size distribution in the particle size concentrated distribution interval has the following characteristics: (120 μm-170 μm): 12.4%; (170 μm-350 μm): 79.4%; (350 μm-400 μm): 8.2%. Wherein the content of the constitutional unit derived from starch is 45.6 wt %, the content of the constitutional unit derived from functional monomer is 32.9 wt %, the content of the MAPS constitutional unit is 7.6 wt %, the content of the NVF constitutional unit is 14.1 wt %, the content of the AA constitutional unit is 11.2 wt %, and the starch was graft polymerized with MAPS, NVF and AA.

Comparative Example 6-2

Starch-containing microspheres were prepared according to the method of Example 6-1, except that 0.05 parts of epoxy chloropropane was not added before adding the monomers (MAPS:NVF:AA=1:1:1), to obtain uniform distributed polydisperse starch-containing microspheres. The starch-containing microspheres have a particle size concentrated distribution interval of 20-180 μm (95.3% of particle sizes are in the interval), and the particle size distribution in the particle size concentrated distribution interval has the following characteristics: (20 μm-60 μm): 32.8%; (60 μm-100 μm): 17.5%; (100 μm-140 μm): 18.2%; (140 μm-180 μm): 31.5%. Wherein the content of the constitutional unit derived from starch is 47.9 wt %, the content of the constitutional unit derived from functional monomer is 33.6 wt %, the content of the MAPS constitutional unit is 10.2 wt %, the content of the NVF constitutional unit is 11.1 wt %, and the content of the AA constitutional unit is 12.3 wt %. Starch was graft polymerized with MAPS, NVF and AA.

Comparative Example 6-3

Starch-containing microspheres were prepared according to the method of Example 6-1, except that the solution of inorganic salt and 3 parts of epoxy chloropropane were added to the starch solution in one portion, to obtain uniformly distributed polydisperse starch-containing microspheres. The starch-containing microspheres have a particle size concentrated distribution interval of 20-200 μm (93.8% of particle sizes are in the interval), and the particle size distribution in the particle size concentrated distribution interval has the following characteristics: (20 μm-65 μm): 9.9%; (65 μm-110 μm): 37.1%; (110 μm-155 μm): 42.2%; (155 μm-200 μm): 10.8%. Wherein the content of the constitutional unit derived from starch is 47.4 wt %, the content of the constitutional unit derived from functional monomer is 37.6 wt %, the content of the MAPS constitutional unit is 11.6 wt %, the content of the NVF constitutional unit is 13.8 wt %, and the content of the AA constitutional unit is 12.2 wt %. Starch was graft polymerized with MAPS, NVF and AA.

Comparative Example 6-4

Starch-containing microspheres were prepared according to the method of Example 6-1, except that triethanolamine was not added, to obtain uniformly distributed polydisperse starch-containing microspheres. The starch-containing microspheres have a particle size concentrated distribution interval of 8-200 μm (91.7% of particle sizes are in the interval), and the particle size distribution in the particle size concentrated distribution interval has the following characteristics: (8 μm-56 μm): 36.3%; (56 μm-104 μm): 21.7%; (104 μm-152 μm): 19.9%; (152 μm-200 μm): 22.1%. Wherein the content of the constitutional unit derived from starch is 45.3 wt %, the content of the constitutional unit derived from functional monomer is 38.2 wt %, the content of the MAPS constitutional unit is 11.6 wt %, the content of the NVF constitutional unit is 12.7 wt %, the content of the AA constitutional unit is 13.9 wt %, and the starch was graft polymerized with MAPS, NVF and AA.

Performance Test

1. Shielding Temporary Plugging Performance Test

The micron-sized starch microspheres prepared in the above examples and comparative examples were evaluated respectively as temporary plugging agents by a sand bed plugging experiment. Experimental instruments: a drilling fluid sand bed filtration loss instrument, a stirrer and an oven. Experimental materials: the well slurry of the Henan oilfield floor 860 well of China petrochemical industry (the density is 1.19 g/cm$^3$), the sample of the examples, the sample of the comparative examples and the 20-40 meshes sand sample.

The experimental steps are as follows:
(1) slurry preparation: preparing drilling fluids with well slurry+3 wt % example samples or comparative samples.
(2) Manufacturing a sand bed: adding 20-40 mesh sand into the cylinder until the 350 mm position, and shaking up;
(3) Adding the drilling fluid (400-500 mL) prepared in step (1), fixing the cylinder on an instrument frame, and sealing the upper and lower channel;
(4) opening an air source, adjusting the pressure to 0.69 mPa, simultaneously opening the upper and lower switch, and measuring the condition that the drilling fluid invades the sand bed within a half-hour.

The experimental results are as follows:

After adding the formula for 30 min, the filtration loss was $FL_1$, it was basically stable after the drilling fluid invaded the sand bed to a depth D. And after a stable mud cake was formed, released pressure, and poured out the drilling fluid, added clear water to a position of 400 mL, pressurized (0.69 mPa), and measured the filtration loss $FL_2$ after 30 min, and the experimental results were shown in tables 1-6.

2. Temperature Resistance and Salt Resistance Test

The temperature resistance and salt resistance of the examples and the comparative examples were evaluated by using a medium-temperature medium-pressure fluid loss instrument.

Experimental instruments: medium-temperature medium-pressure filtration loss instrument, stirrer, aging kettle and roller heating furnace.

Experimental materials: the well slurry of the Henan oilfield floor 860 well of China petrochemical industry (the density is 1.19 g/cm$^3$), the examples' samples and the comparative examples' samples.

The experimental steps are as follows:
(1) Slurry preparation: preparing drilling fluids with well slurry+5 wt % NaCl+5 wt % $CaCl_2$+3 wt % of example samples or comparative example samples.
(2) High-temperature aging of the drilling fluid: placing 350 mL drilling fluid obtained in step (1) in an aging kettle. And then placing the aging kettle in a roller heating furnace to age the drilling fluid with microspheres for 16 hours at 180° C.
(3) Evaluating the temperature resistance and salt resistance: cooling the aged drilling fluid to room temperature, pouring the cooled drilling fluid into an evaluation tank, and then installing the evaluation tank on a medium-temperature medium-pressure filtration loss instrument. Opening an air source, adjusting the pressure to 0.69 mPa, then opening an air inlet switch, and measuring the water loss of the drilling fluid within a half-hour.

The experimental results are as follows:

The fluid loss of the drilling fluid is $FL_3$ 30 min after the start of the test, and the test results are shown in tables 1-6.

3. Linear Expansion Rate of Clay Test 5 g calcium bentonite (Hebei Wayanggu mineral product trade company, Ltd.) was pressed for 5 min under 6 MPa, and the experimental clay block was obtained. The swelling amount of clay block in clean water or in suspensions of different modified starch-containing microspheres within 3 h was measured using a shale dilatometer (Qingdao Hengtaida electromechanical devices, Co., Ltd.), and thereby to calculate linear swelling rate R1, R2 (swelling rate=swelling amount/initial height×100%), wherein R1 was 56%.

Experimental materials: the well slurry of Henan oilfield floor 860 well of China petrochemical industry (the density is 1.19 g/cm$^3$), the shale dilatometer, example samples and comparative example samples. The test results are shown in tables 1 to 6.

TABLE 1

| Examples | Filtration loss $FL_1$/mL | Depth D/mm | Filtration loss $FL_2$/mL | Filtration loss $FL_3$/mL | R2% |
|---|---|---|---|---|---|
| Example 1-1 | 0 | 200 | 0 | 25 | 23 |
| Example 1-2 | 0 | 120 | 0 | 12 | 29 |
| Example 1-3 | 0 | 180 | 0 | 30 | 32 |
| Example 1-4 | 0 | 150 | 0 | 21 | 25 |
| Example 1-5 | 0 | 205 | 0 | 25 | 29 |
| Comparative Example 1-1 | 2 | 350 | 55 | 65 | 52 |
| Comparative Example 1-2 | 0 | 310 | 12 | 60 | 49 |
| Comparative Example 1-3 | 3 | 350 | 60 | 58 | 49 |
| Comparative Example 1-4 | 0 | 330 | 20 | 55 | 46 |

TABLE 2

| Examples | Filtration loss $FL_1$/mL | Depth D/mm | Filtration loss $FL_2$/mL | Filtration loss $FL_3$/mL | R2% |
|---|---|---|---|---|---|
| Example 2-1 | 0 | 135 | 0 | 5 | 20 |
| Example 2-2 | 0 | 170 | 0 | 2 | 17 |
| Example 2-3 | 0 | 190 | 0 | 2 | 16 |
| Example 2-4 | 0 | 200 | 0 | 1 | 14 |
| Example 2-5 | 0 | 220 | 0 | 10 | 23 |
| Example 2-6 | 0 | 205 | 0 | 3 | 13 |
| Example 2-7 | 0 | 145 | 0 | 1 | 17 |
| Example 2-8 | 0 | 205 | 0 | 1 | 18 |
| Comparative Example 2-1 | 2 | 350 | 65 | 45 | 43 |
| Comparative Example 2-2 | 0 | 310 | 15 | 40 | 40 |
| Comparative Example 2-3 | 3 | 350 | 73 | 39 | 39 |
| Comparative Example 2-4 | 0 | 330 | 22 | 33 | 36 |

TABLE 3

| Examples | Filtration loss $FL_1$/mL | Depth D/mm | Filtration loss $FL_2$/mL | Filtration loss $FL_3$/mL | R2% |
|---|---|---|---|---|---|
| Example 3-1 | 0 | 125 | 0 | 11 | 9 |
| Example 3-2 | 0 | 160 | 0 | 15 | 11 |
| Example 3-3 | 0 | 210 | 0 | 10 | 8 |
| Example 3-4 | 0 | 220 | 0 | 8 | 7 |
| Example 3-5 | 0 | 205 | 0 | 25 | 17 |
| Example 3-6 | 0 | 200 | 0 | 21 | 14 |
| Example 3-7 | 0 | 150 | 0 | 16 | 11 |
| Example 3-8 | 0 | 190 | 0 | 24 | 17 |
| Comparative Example 3-1 | 2 | 350 | 70 | 60 | 37 |
| Comparative Example 3-2 | 0 | 330 | 22 | 54 | 33 |
| Comparative Example 3-3 | 3 | 350 | 54 | 55 | 32 |
| Comparative Example 3-4 | 0 | 315 | 13 | 49 | 30 |

TABLE 4

| Examples | Filtration loss $FL_1$/mL | Depth D/mm | Filtration loss $FL_2$/mL | Filtration loss $FL_3$/mL | R2% |
|---|---|---|---|---|---|
| Example 4-1 | 0 | 130 | 0 | 11 | 21 |
| Example 4-2 | 0 | 175 | 0 | 13 | 22 |
| Example 4-3 | 0 | 170 | 0 | 10 | 20 |
| Example 4-4 | 0 | 210 | 0 | 6 | 17 |
| Example 4-5 | 0 | 200 | 0 | 20 | 26 |
| Example 4-6 | 0 | 165 | 0 | 16 | 23 |
| Example 4-7 | 0 | 210 | 0 | 15 | 23 |
| Example 4-8 | 0 | 200 | 0 | 11 | 20 |
| Comparative Example 4-1 | 2 | 350 | 80 | 55 | 46 |
| Comparative Example 4-2 | 0 | 340 | 24 | 51 | 43 |
| Comparative Example 4-3 | 3 | 350 | 55 | 50 | 38 |
| Comparative Example 4-4 | 0 | 300 | 20 | 44 | 40 |

TABLE 5

| Examples | Filtration loss $FL_1$/mL | Depth D/mm | Filtration loss $FL_2$/mL | Filtration loss $FL_3$/mL | R2% |
|---|---|---|---|---|---|
| Example 5-1 | 0 | 160 | 0 | 6 | 23 |
| Example 5-2 | 0 | 180 | 0 | 2 | 20 |
| Example 5-3 | 0 | 135 | 0 | 5 | 23 |
| Example 5-4 | 0 | 220 | 0 | 2 | 20 |
| Example 5-5 | 0 | 210 | 0 | 15 | 29 |
| Example 5-6 | 0 | 210 | 0 | 10 | 26 |
| Example 5-7 | 0 | 170 | 0 | 6 | 23 |
| Example 5-8 | 0 | 200 | 0 | 3 | 21 |
| Comparative Example 5-1 | 4 | 350 | 75 | 50 | 49 |
| Comparative Example 5-2 | 0 | 300 | 8 | 44 | 46 |
| Comparative Example 5-3 | 3 | 350 | 40 | 45 | 43 |
| Comparative Example 5-4 | 0 | 340 | 20 | 38 | 43 |

TABLE 6

| Examples | Filtration loss $FL_1$/mL | Depth D/mm | Filtration loss $FL_2$/mL | Filtration loss $FL_3$/mL | R2% |
|---|---|---|---|---|---|
| Example 6-1 | 0 | 140 | 0 | 2 | 13 |
| Example 6-2 | 0 | 180 | 0 | 4 | 17 |
| Example 6-3 | 0 | 200 | 0 | 2 | 14 |
| Example 6-4 | 0 | 200 | 0 | 1 | 10 |
| Example 6-5 | 0 | 220 | 0 | 5 | 20 |
| Example 6-6 | 0 | 190 | 0 | 4 | 14 |
| Example 6-7 | 0 | 150 | 0 | 4 | 15 |
| Example 6-8 | 0 | 205 | 0 | 2 | 17 |
| Example 6-9 | 0 | 210 | 0 | 3 | 11 |
| Example 6-10 | 0 | 240 | 0 | 2 | 10 |
| Example 6-11 | 0 | 175 | 0 | 6 | 27 |
| Example 6-12 | 0 | 195 | 0 | 4 | 29 |
| Comparative Example 6-1 | 4 | 350 | 8 | 40 | 40 |
| Comparative Example 6-2 | 0 | 300 | 11 | 35 | 37 |
| Comparative Example 6-3 | 4 | 350 | 53 | 33 | 36 |
| Comparative Example 6-4 | 0 | 340 | 25 | 29 | 33 |

From the results, in shielding temporary plugging performance test in clean water under the pressure of 0.69 mPa, the filtration loss of example samples within 30 min is significantly lower than that of comparative example samples, and thus the plugging effect is good. In shielding temporary plugging performance test in clean water under the pressure of 0.69 mPa, the filtration loss of comparative example samples within 30 min can reach 40 mL, and thus the result is not good.

In the evaluation of the temperature resistance and salt resistance, in clean water at a pressure of 0.69 mPa, the filtration loss of examples' samples within 30 min was lower than that of the comparative examples' samples under the same conditions, and thus the temperature resistance and salt resistance were excellent. For comparative example samples, the largest fluid loss of the drilling fluid within 30 min at a pressure of 0.69 mPa can reach 65 mL.

From the results of the above R1 and R2, it can be seen that when examples' samples were used, the linear expansion rate of the clay block in the suspension of modified starch-containing microspheres is only 8% at most, could significantly inhibit the clay from being hydrated and dispersed, thus could effectively improve stability of the well in the application. When comparative examples' samples were used, the linear expansion rate of the clay blocks in the suspension of the modified starch-containing microspheres can reach 52% at most, slightly lower than the linear expansion rate in clear water, thus could not inhibit the well wall clay from being hydrated and dispersed well.

The invention claimed is:

1. A method for preparing starch-containing microspheres, comprising:
   (1) adding a first cross-linking agent, a polymerizable monomer, and an initiator into an aqueous solution comprising starch and a solubilizer to carry out a cross-linking reaction at 60-80° C. for 3-6 h to form a first mixture;
   (2) mixing a zwitterionic surfactant into the first mixture to form a second mixture;
   (3) adding a second cross-linking agent and an inorganic salt into the second mixture at 30-60° C. to form starch-containing microspheres in the second mixture; and
   (4) filtering the second mixture and drying a residue to obtain the starch-containing microspheres,
   wherein the first cross-linking agent and the second cross-linking agent are each independently selected from epoxy chloropropane, phosphorus oxychloride, sodium trimetaphosphate, adipic acid, sodium hexametaphosphate, and mixtures thereof,
   wherein the second cross-linking agent and the inorganic salt are in one solution being added to the second mixture or in two different solutions being simultaneously added to the second mixture,
   wherein the polymerizable monomer is one or more of a cationic monomer, an anionic monomer, a zwitterionic monomer, and a nonionic monomer,
   the cationic monomer being one or more of methacryloyloxyethyl trimethyl ammonium chloride, acryloyloxyethyl trimethyl ammonium chloride, acryloyloxyethyl dimethyl benzyl ammonium chloride, dimethyl diallyl ammonium chloride, and diethyl diallyl ammonium chloride;
   the anionic monomer being one or more of acrylic acid, 2-methyl-2-acrylamido propanesulfonic acid, fumaric acid, sodium allyl sulfonate, and sodium 2-acryloyloxy isopentene sulfonate;
   the zwitterionic monomer being one or more of methacryloyloxyethyl-N, N-dimethyl propane sulfonate, N, N-dimethyl allyl amine propane sulfonate, 4-vinylpyridine propane sulfonate, N-methyl diallyl propane sulfonate, and N-methyl diallyl butane sulfonate; the nonionic monomer is one or more of N-vinyl pyrrolidone, acrylonitrile, vinyl formamide, and vinyl acetamide; and
   the initiator being potassium persulfate, sodium persulfate, or ammonium persulfate, wherein the starch is selected from mung bean starch, tapioca starch, ipomoea batatas starch, sweet potato starch, potato starch, wheat starch, water chestnut starch, lotus root starch, corn starch, and mixtures thereof, and
   wherein the solubilizer is selected from trimethanolamine, triethanolamine, tripropanolamine, and N, N-bisdiethanol amine.

2. The method of claim 1, wherein the solubilizer is added to the aqueous solution at a temperature of 20° C. to 80° C., and the weight ratio of the starch to the solubilizer is 1-20:10-50.

3. The method of claim 1, wherein the cross-linking reaction in step (1) is carried out for 0.5-4 h at a temperature of 20-80° C.

4. The method of claim 1, wherein the zwitterionic surfactant in step (2) has a structural formula as follows:

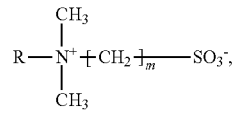

wherein m is an integer of 2-6, R is a saturated carbon chain containing 1-18 carbon atoms, wherein the zwitterionic surfactant is selected from dimethyldodecylsulfopropyl ammonium salt, dimethylhexadecylsulfoethyl ammonium salt, dimethyloctadecylsulfobutyl ammonium salt, dimethyl (3-hydroxydodecyl) sulfopropyl ammonium salt, dimethyl (6-aminotetradecyl) sulfoethyl ammonium salt, and mixtures thereof.

5. The method of claim 4, wherein the inorganic salt in step (3) is selected from the group consisting of sodium chloride, sodium bromide, sodium sulfate, sodium sulfite, sodium carbonate, sodium bicarbonate, sodium nitrate, sodium phosphate, sodium hydrogen phosphate, sodium silicate, potassium chloride, potassium bromide, potassium sulfate, potassium sulfite, potassium carbonate, potassium bicarbonate, potassium nitrate, potassium phosphate, potassium hydrogen phosphate, potassium silicate, ammonium chloride, ammonium bromide, ammonium nitrate, calcium chloride, calcium bromide, magnesium chloride, magnesium bromide, magnesium sulfate, magnesium nitrate, and mixtures thereof.

6. The method of claim 1, wherein the solubilizer is triethanolamine, the first cross-linking agent and the second cross-linking agent are epoxy chloropropane, and amounts of water, the starch, the triethanolamine, the epoxy chloropropane, the zwitterionic surfactant and the solution of inorganic salt are, in parts by weight: 100 parts of water, 1-20 parts of starch, 10-50 parts of triethanolamine, 0.105-14.6 parts of epoxy chloropropane, 0.05-10 parts of zwitterionic surfactant and 0.5-200 parts of solution of inorganic salt, wherein the inorganic salt solute accounts for 0.025-50 parts.

7. The method of claim 1, wherein the solubilizer is triethanolamine, the first cross-linking agent and the second cross-linking agent are epoxy chloropropane, and the amounts of the water, the starch, the triethanolamine, the epoxy chloropropane, the zwitterionic surfactant, the monomer, the initiator and the solution of inorganic salt are, in parts by weight: 100 parts of water, 1-20 parts of starch, 10-50 parts of triethanolamine, 0.105-14.6 parts of epoxy chloropropane, 0.05-10 parts of zwitterionic surfactant, 0.1-20 parts of polymerizable monomer, 0.001-0.2 part of initiator and 0.5-200 parts of solution of inorganic salt, wherein the inorganic salt solute accounts for 0.025-50 parts.

8. The method of claim 1, wherein relative to 100 parts by weight of water, the part of the first cross-linking agent in step (1) is 0.005-0.6 parts.

9. The method of claim 1, wherein, in the obtained starch-containing microspheres, more than 90 wt % of the starch-containing microspheres are in a concentrated distribution range that is within the range of 0.1-500 μm, and when the concentrated distribution range is divided into a plurality of intervals, a proportion of microspheres in each interval is as follows:

$$\frac{100}{n}\% \pm \frac{10}{n}\%,$$

n is the number of the plurality of intervals by which the concentrated distribution range is divided into, and is an integer between 4 and 10.

10. The method of claim 1, wherein the obtained starch-containing comprises a graft copolymer formed by starch and a polymerizable monomer selected from at least one of an anionic monomer, a cationic monomer, a nonionic monomer, and a zwitterionic monomer, wherein, the zwitterionic monomer is selected from one or more of methacryloyloxyethyl-N,N-dimethyl propane sulfonate, N,N-dimethyl allyl amine propane sulfonate, 4-vinylpyridine propane sulfonate, N-methyl diallyl propane sulfonate, and N-methyl diallyl butane sulfonate; the cationic monomer is selected from one or more of methacryloyloxyethyl trimethyl ammonium chloride, acryloyloxyethyl trimethyl ammonium chloride, acryloyloxyethyl dimethyl benzyl ammonium chloride, dimethyl diallyl ammonium chloride, and diethyl diallyl ammonium chloride; the anionic monomer is selected from one or more of acrylic acid, 2-methyl-2-acrylamido propane sulfonic acid, fumaric acid, sodium allyl sulfonate, and sodium 2-acryloyloxy isopentene sulfonate; and the nonionic monomer is selected from one or more of N-vinyl pyrrolidone, acrylonitrile, vinyl formamide, and vinyl acetamide.

11. A method for sealing an oil-gas reservoir, comprising introducing the temporary plugging agent obtained according to the method of claim 1 into a formation containing pores or microcracks, wherein the temporary plugging agent plugs the pores and/or microcracks.

12. A drilling fluid comprising the starch-containing microspheres produced according to the method of claim 1.

13. The method of claim 1, wherein, in step (3), the second cross-linking agent and the solution of inorganic salt are simultaneously added dripwise into the second mixture.

* * * * *